(12) United States Patent
Ebara

(10) Patent No.: US 7,781,552 B2
(45) Date of Patent: Aug. 24, 2010

(54) STYRENE COPOLYMER AND PROCESS FOR PRODUCING THE SAME

(75) Inventor: Kenji Ebara, Kurashiki (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 501 days.

(21) Appl. No.: 10/577,931

(22) PCT Filed: Nov. 5, 2004

(86) PCT No.: PCT/JP2004/016432

§ 371 (c)(1),
(2), (4) Date: May 2, 2006

(87) PCT Pub. No.: WO2005/044864

PCT Pub. Date: May 19, 2005

(65) Prior Publication Data

US 2007/0083024 A1    Apr. 12, 2007

(30) Foreign Application Priority Data

Nov. 6, 2003   (JP)   ............... 2003-376923

(51) Int. Cl.
*C08F 12/08* (2006.01)
*C08F 12/12* (2006.01)
(52) U.S. Cl. .................. 526/347.1; 526/346
(58) Field of Classification Search .............. 526/346, 526/347.1
See application file for complete search history.

(56) References Cited

U.S. PATENT DOCUMENTS

| | | | |
|---|---|---|---|
| 4,659,790 A * | 4/1987 | Shimozato et al. | ........... 526/87 |
| 4,883,846 A * | 11/1989 | Moore et al. | ............ 526/73 |
| 7,101,941 B2 * | 9/2006 | Desbois et al. | ........... 526/177 |
| 7,449,518 B2 * | 11/2008 | Bening et al. | ............ 525/98 |
| 2003/0181610 A1 * | 9/2003 | Ikematsu et al. | ........... 526/173 |

FOREIGN PATENT DOCUMENTS

| | | |
|---|---|---|
| CN | 85 1 04523 | 2/1987 |
| DE | 10307058 A1 * | 9/2004 |
| EP | 0 087 165 | 8/1983 |
| JP | 48-76982 | 10/1973 |
| JP | 48-99284 | 12/1973 |
| JP | 50-3486 | 1/1975 |
| JP | 58-189209 | 11/1983 |
| JP | 3-81307 | 4/1991 |
| JP | 6-41241 | 2/1994 |
| JP | 6-279546 | 10/1994 |
| JP | 7-18014 | 1/1995 |
| JP | 10-158338 | 6/1998 |
| JP | 2000-143911 | 5/2000 |
| JP | 2000-169521 | 6/2000 |
| JP | 2003-213059 | 7/2003 |
| WO | WO 9837112 A1 * | 8/1998 |

OTHER PUBLICATIONS

Claudy et al. Glass Transition of Polystyrene Versus Molecular Weight. Polymer Bulletin 9. 1983. p. 208.*
Machine translation for DE 10307058 A1, Sep. 2004, Desboise et al.*
Korean Patent Office Action, mailed Apr. 19, 2007 and issued in corresponding Korean Patent Application No. 10-2006-7011094.
Office Action issued in corresponding Chinese Patent Application No. 200480032598.7, on Jan. 18, 2008.
Duane B. Priddy, et al., "Heat Resistant Styrene / α-Methylstyrene Copolymers Made via Continuous Anionic Polymerization at High Temperature", Journal of Applied Polymer Science, vol. 14, pp. 383-390 (1990).

* cited by examiner

*Primary Examiner*—Milton I Cano
*Assistant Examiner*—Brieann R Fink
(74) *Attorney, Agent, or Firm*—Staas & Halsey LLP

(57) ABSTRACT

A styrene resin excellent in heat resistance, weatherability, melt stability, and suitability for recycling. It is a styrene copolymer obtained by living polymerization ($M_w/M_n$=1.6-4.0) which comprises isopropenylaromatic units (A) contained in an amount of 5 to 95 wt. % and vinylaromatic units, and has a glass transition temperature ($T_g$) which satisfies a specific relationship defined by the content of isopropenylaromatic units (A) in the copolymer.

12 Claims, 7 Drawing Sheets

FIG. 10

(EXAMPLE 1) WHEN INLET AND OUTLET ARE POSITIONED ABOUT THE SAME DISTANCE FROM SOLUTION LEVEL

<DIAGRAM VIEWED FROM SIDE>

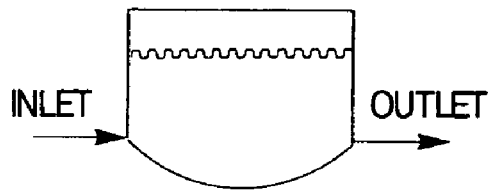

<DIAGRAM VIEWED FROM TOP>

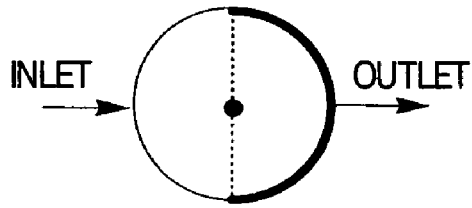

* THE OUTLET SHOULD BE PROVIDED WITHIN THE THICK LINE AREA (EXAMPLE 2) WHEN SOLUTION TO BE POLYMERIZED IS LOADED IN AN AMOUNT OF 100%

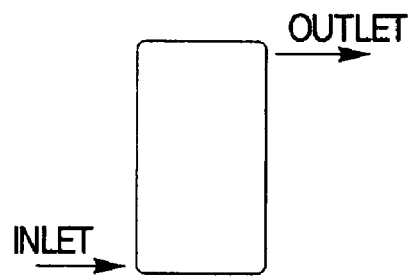

(EXAMPLE 3) WHEN SOLUTION TO BE POLYMERIZED IS NOT LOADED IN AN AMOUNT OF 100%

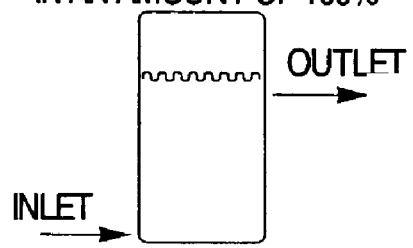

<DIAGRAM VIEWED FROM TOP>

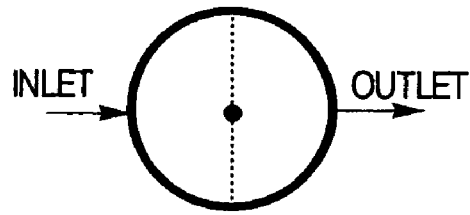

* THE OUTLET SHOULD BE PROVIDED WITHIN THE THICK LINE AREA

STYRENE COPOLYMER AND PROCESS FOR PRODUCING THE SAME

This application is based on and hereby claims priority to PCT Application No. PCT/JP2004/016432 filed on Nov. 5, 2004 and Japanese Application No. 2003-376923 filed on Nov. 6, 2003, the contents of which are hereby incorporated by reference.

TECHNICAL FIELD

The present invention relates to a styrenic copolymer which is excellent in heat resistance, weatherability, melt stability, moldability, strength and rigidity, and to a method of producing the same.

BACKGROUND ART

A styrenic resin can employ various types of molding such as injection molding, oriented sheet molding, film molding, foamed sheet molding, foamed board molding, and blow molding, and is excellent in material performance such as transparency, rigidity, and dimensional stability. Furthermore, many styrenic resins can be produced in large quantities at a low price by means of block polymerization by a free-radical polymerization method; solution polymerization with a high concentration of monomers; suspension polymerization; or emulsion polymerization. Accordingly, styrenic resins have been used for a very wide variety of uses. Among them, a homopolymer of styrene, such as polystyrene or GPPS, is a resin that is most versatilely utilized.

Polystyrene serves many uses, due to its many excellent performance characteristics and its cheapness. However, there have been uses unsatisfied even with the performance characteristics of this resin, for example, a use for which the resin is not available due to its poor heat resistance. Specifically, GPPS is about 100° C. (which is its glass transition point) in heat resistance, and thus in any of its uses wherein the resin is brought into contact with heated water-vapor for boiling sterilization, its uses wherein the resin needs to be heated with an electronic oven for food packaging, its uses wherein a molded part of the resin as installed in a vehicle tends to be subjected to a high-temperature atmosphere in summer, and the like, the resultant molded product could not be utilized without the concern of the risk of deformation.

One of the methods of enhancing the heat resistance of polystyrene is a method of copolymerizing styrene and a monomer having a polar functional group, whereby for example, a copolymer (SMAA) of styrene and methacrylic acid, a copolymer (SMA) of styrene and maleic anhydride, a copolymer of styrene and maleimide anhydride, an the like can be derived. The heat resistance of each of these copolymers can be freely changed by controlling the amount of a monomer having a polar functional group incorporated into the copolymer. However, when subjected to a high temperature, a copolymer having a polar functional group may cause the crosslinking reaction of a polymeric chain due to a side reaction of the polar group, followed by the production of a gel-like material, and the degradation of the molding-processing properties due to an increment in viscosity. Thus, such copolymers have not been sufficiently accepted by users in light of quality and productivity considerations.

Additionally, the fact that a copolymer having a polar functional group tends to cause a crosslinking reaction during a high-temperature melt-retention means that the high-molecular-weight product is easily denatured during molding processing. This means that it is difficult to recycle or reuse the resin. For example, when an injection-molded product is derived, a mold sprue and/or a runner may be caused, and when a molded product is derived from a twin-screw stretched sheet or a foamed sheet, a discard (or a skeleton) in addition to the molded product may be formed. Generally, these have been partially mixed with virgin pellets after crushing or cutting so as to be reused, or otherwise partially mixed with a general-purpose resin such as polystyrene to be reused.

However, when the fluidity of the resin is changed due to the crosslinking of the high-molecular-weight product during melt-processing, it is difficult to reuse the resin, and utilization of the resin as a recycling material for virgin pellets may be limited. Furthermore, a copolymer having a polar functional group is generally incompatible with polystyrene, and even when melted and mixed with polystyrene, not only the mechanical properties are decreased, but also the transparency is lost. Due to such problems, a copolymer having a polar functional group has not been utilized even as a recycling material for a general-purpose polystyrene.

In recent years, a high value has been attached to the effective utilization of a resin, while various recycle laws were instituted and have been enforced. It may be required in a commercial scene of future that a resin can be recycled, reworked and reused. As a resin material to be developed in the future, a resin which is reused effectively without substantially causing the generation of a monomer or a decrease in molecular weight due to the breakage of high-molecular chains, even if the resin material is subjected to melt processing several times, will be needed. Therefore, the development of such a resin material which is higher in melt stability than a conventional styrenic copolymer has been desired.

Another problem of a conventional styrenic resin having heat resistance is that the range of working conditions during molding is narrow.

A copolymer being enhanced in heat resistance is synonymous with enhancement of the temperature at which a polymer chain starts to be fluidized. Therefore, in order to derive the same fluidity as that of polystyrene during molding processing, a processing temperature should be enhanced corresponding to the increase of heat resistance. However, a kick-off temperature of a styrenic copolymer having a polar functional group can not be enhanced corresponding to the increase of heat resistance. Therefore, there has been the problem that the range of molding processing temperature is narrowed, whereby its productivity and quality are decreased.

There is also a method for enhancing the heat resistance of a styrenic resin by using a monomer having no polar functional group. For example, it is known that a copolymer of styrene and α-methylstyrene has its glass-transition temperature enhanced according to the content of α-methylstyrene (see, for example, Non-Patent Document No. 1). However, α-methylstyrene has a ceiling temperature as low as about 60° C. Therefore, the copolymerization of styrene and α-methylstyrene was attempted using a radical solution-polymerization, which is a typical example of the industrial production method. As a result, a number of problems were detected, for example, 1) that it is difficult to derive a high-molecular-weight product; 2) that the content of α-methylstyrene in the copolymer is limited, whereby a desired heat resistance cannot be achieved; 3) that because of bad heat-stability during melting, some molding-processing conditions cause thermal decomposition of the copolymer, whereby the generation of a monomer component and/or a decrease in molecular weight tend to be caused; 4) that the resin pellets tend to be yellowed, and thus some uses need the addition of a coloring agent; and the like. Therefore, no copolymers of styrene and α-methylstyrene have ever been industrially utilized.

On the other hand, since α-methylstyrene can be subjected to a polymerization by living anionic polymerization with a butyllithium initiator, a copolymer of styrene and α-methylstyrene can be produced by living anionic polymerization (see, for example, Patent Document No. 1).

However, with respect to a copolymer as derived on the basis of a known production method by living anionic polymerization, the following problems have been detected. Therefore, sufficient usefulness as a resin product could not be found therefrom, and thus no such copolymers have ever been industrially utilized.

That is, the above problems are as follows:

1) A produced polymer will be yellowed. The degree of yellowing is correlated with the content of Li. Therefore, there was an area wherein the balance between a molecular weight objective and yellowing property is upset, so that it was difficult to utilize the polymer, in particular, for uses wherein yellowing is not preferred, such as a use for a food packaging, and a use for an optical product.

2) The polymer shows bad heat-stability during melting, and thus the polymer is decomposed during its melt retention so as to generate styrene and α-methylstyrene. The amount of the decomposition products is larger than the amount of the decomposition products from polystyrene as produced according to a free-radical polymerization method which is generally and widely utilized, under the same conditions. This fact means that when the molding-processing temperature of the copolymer of styrene and α-methylstyrene is elevated by the degree to which the heat resistance of the copolymer is higher enhanced than that of polystyrene, the copolymer generates styrene and α-methylstyrene during molding in a larger amount than the amount of the decomposition products from polystyrene as derived according to free-radical polymerization method. Therefore, it is easily predicted that there will occur the problems that some molding conditions tend to cause a silver blister due to volatile components as generated by the decomposition, such as styrene, α-methylstyrene and the like; that the molecular weight of the copolymer tends to be decreased, which is prone to cause the deterioration of the mechanical properties; in particular, that it is difficult to reuse the resultant molded product as a recycling material; and the like. The fact that the molding processing can be utilized merely in an extremely limited range naturally means that the practical uses of the copolymer are limited. Therefore, it can be presumed that such polymers have not been widely and industrially accepted.

As another disadvantage of polystyrene, the disadvantage that polystyrene is not suitable for a use wherein polystyrene may be exposed to the sun, due to its bad weatherability, can be enumerated. The bad weatherability is predominantly due to the structure of the high-molecular-weight product. Therefore, first of all, the development of a styrenic copolymer, having the weatherability of the high-molecular-weight product itself enhanced without relying on an additive such as a weathering stabilizer or an ultraviolet absorber, has been desired.

Non-Patent Document No. 1: Journal of Applied Polymer Science, Vol. 41, p. 383 (1990).

Patent Document No. 1: Japanese Patent KOKOKU Publication (JPB) No. 6-10219.

DISCLOSURE OF INVENTION

Problem to be Solved by the Invention

It is an object of the present invention to provide a styrenic copolymer that is improved in heat resistance and weatherability, which are weak points of polystyrene, and that is further excellent in melt stability, moldability, strength, rigidity and recycle properties, while retaining the excellent properties of a conventional polystyrene, such as transparency, dimensional stability, and molding-processing properties.

Means for Solving the Problem

In order to solve the problems as described above, the present inventors have been devoted to making efforts. As a result, they have found that only a copolymer derived by means of a specific polymerization method, comprising an aromatic isopropenyl monomer and an aromatic vinyl monomer, wherein the copolymer component has specific performance factors satisfying predetermined ranges, can solve the problems as described above. The present invention has been accomplished on the basis of such information.

That is, the present invention comprises the following modes:

1. A styrenic copolymer produced by a living polymerization method, comprising an isopropenyl aromatic unit represented by the formula (1):

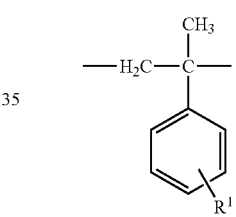

wherein the substituent group $R^1$ represents hydrogen, or a hydrocarbon radical of $—C_nH_{2n+1}$ wherein n is an integer number of 1 or more, and a vinyl aromatic unit represented by the formula (2):

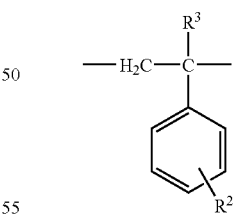

wherein the substituent group $R^2$ represents hydrogen, or a hydrocarbon radical of $—C_nH_{2n+}$ wherein n is an integer number of 1 or more, and the substituent group $R^3$ represents hydrogen or a phenyl radical, wherein the content (A) of said isopropenyl aromatic unit in said styrenic copolymer is in the range of 5 to 95% by weight, the ratio (Mw/Mn) of the weight-average molecular weight (Mw) of said styrenic copolymer to the number-average molecular weight (Mn) thereof is in the range of 1.6 to 4.0, and wherein the relationship between the content (% by weight) (A) of said isopropenyl aromatic unit in said styrenic copolymer and the glass-transition temperature (° C.) (Tg) of said styrenic copolymer satisfies the formulae (a):

$0.12A+102 \leq Tg \leq 0.62A+102$ (in case of $5 \leq A \leq 20$), $-5.25 \times 10^{-5}A^3 + 1.09 \times 10^{-2}A^2 + 1.72 \times 10^{-1}A + 97 \leq Tg \leq -5.25 \times 10^{-5}A^3 + 1.09 \times 10^{-2}A^2 + 1.72 \times 10^{-1}A + 107$ (in case of $20 < A \leq 60$), and $1.04A+73 \leq Tg \leq 0.79A+98$ (in case of $60 < A \leq 95$).

2. A styrenic copolymer according to the mode 1 as described above, wherein the content (% by weight) (A) of said isopropenyl aromatic unit in said styrenic copolymer, and the absorbance (B) of said styrenic copolymer at a light having a wavelength of 305 nm satisfy the formula (b):

$B \leq 0.0002A^2 - 0.0017A + 0.52$.

3. A styrenic copolymer according to the mode 1 as described above, wherein the relationship between the content (% by weight) (A) of said isopropenyl aromatic unit in said styrenic copolymer and the weight-average molecular weight (Mw) of said styrenic copolymer satisfies the formula (c):

$-1.92 \times 10^{-2}A^2 + 2.95 \times 10^{-1}A + 98.2 \leq Mw \times 10^{-3} \leq \exp(6.37 - 2.77 \times 10^{-2}A)$.

4. A styrenic block copolymer of
    a styrenic copolymer comprising
    an isopropenyl aromatic unit represented by the formula (1):

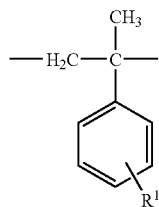

wherein the substituent group $R^1$ represents hydrogen, or a hydrocarbon radical of $-C_nH_{2n+1}$ wherein n is an integer number of 1 or more, and
    a vinyl aromatic unit represented by the formula (2):

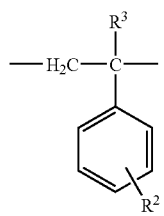

wherein the substituent group $R^2$ represents hydrogen, or a hydrocarbon radical of $-C_nH_{2n+1}$ wherein n is an integer number of 1 or more, and the substituent group $R^3$ represents hydrogen or a phenyl radical; and
    a styrenic polymer comprising a vinyl aromatic unit represented by the above formula (2),
    wherein the ratio (Mw/Mn) of the weight-average molecular weight (Mw) of said styrenic block copolymer to the number-average molecular weight (Mn) thereof is in the range of 1.6 to 4.0.

5. A styrenic copolymer composition comprising a mixture of at least two styrenic copolymers selected from styrenic copolymers comprising
    an isopropenyl aromatic unit represented by the formula (1):

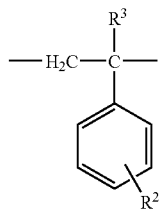

wherein the substituent group $R^1$ represents hydrogen, or a hydrocarbon radical of $-C_nH_{2n+1}$ wherein n is an integer number of 1 or more, and
    a vinyl aromatic unit represented by the formula (2):

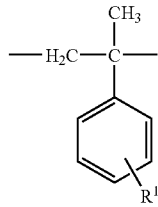

wherein the substituent group $R^2$ represents hydrogen, or a hydrocarbon radical of $-C_nH_{2n+1}$ wherein n is an integer number of 1 or more, and the substituent group $R^3$ represents hydrogen or a phenyl radical,
    wherein each of said at least two styrenic copolymers has a copolymerization composition ratio and/or a weight-average molecular weight which are different from those of the others.

6. A styrenic copolymer composition comprising a mixture of at least two styrenic copolymers selected from styrenic copolymers, which are produced by a continuous living polymerization method, comprising
    an isopropenyl aromatic unit represented by the formula (1):

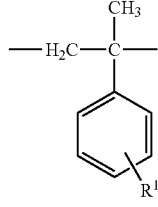

wherein the substituent group $R^3$ represents hydrogen, or a hydrocarbon radical of $-C_nH_{2n+1}$ wherein n is an integer number of 1 or more, and
    a vinyl aromatic unit represented by the formula (2):

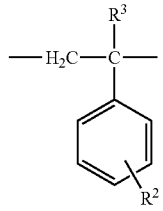

wherein the substituent group $R^2$ represents hydrogen, or a hydrocarbon radical of $-C_nH_{2n+1}$ wherein n is an integer number of 1 or more, and the substituent group $R^3$ represents hydrogen or a phenyl radical, said styrenic copolymers being synthesized by providing

[an isopropenyl aromatic monomer represented by the formula (3):

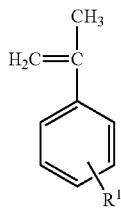

wherein the substituent group $R^1$ represents hydrogen, or a hydrocarbon radical of —$C_nH_{2n+1}$ wherein n is an integer number of 1 or more], and

[a vinyl aromatic monomer represented by the formula (4):

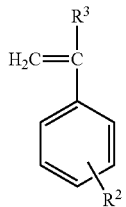

wherein the substituent group $R^2$ represents hydrogen, or a hydrocarbon radical of —$C_nH_{2n+1}$ wherein n is an integer number of 1 or more, and the substituent group $R^3$ represents hydrogen or a phenyl radical] into a polymerization reactor while the composition ratio of [said isopropenyl aromatic monomer represented by the formula (3)] to [said vinyl aromatic monomer represented by the formula (4)] in a raw material solution comprising said isopropenyl aromatic monomer and said vinyl aromatic monomer is continuously or intermittently changed, and each of said at least two styrenic copolymers having a composition ratio of [said isopropenyl aromatic monomer represented by the formula (3)] to [said vinyl aromatic monomer represented by the formula (4)] is different from that of the others.

7. A styrenic copolymer produced by a continuous living polymerization method, comprising an isopropenyl aromatic unit represented by the formula (1):

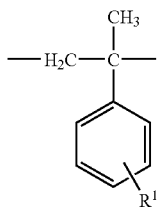

wherein the substituent group $R^1$ represents hydrogen, or a hydrocarbon radical of —$C_nH_{2n+1}$ wherein n is an integer number of 1 or more, and a vinyl aromatic unit represented by the formula (2):

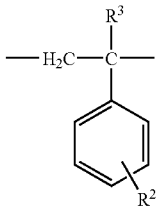

wherein the substituent group $R^2$ represents hydrogen, or a hydrocarbon radical of —$C_nH_{2n+1}$ wherein n is an integer number of 1 or more, and the substituent group $R^3$ represents hydrogen or a phenyl radical, wherein the total amount of:

an isopropenyl aromatic monomer represented by the formula (3):

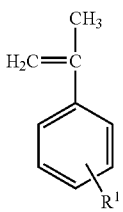

wherein the substituent group $R^1$ represents hydrogen, or a hydrocarbon radical of —$C_nH_{2n+1}$ wherein n is an integer number of 1 or more, a vinyl aromatic monomer represented by the formula (4):

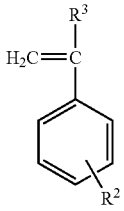

wherein the substituent group R2 represents hydrogen, or a hydrocarbon radical of —$C_nH_{2n+1}$ wherein n is an integer number of 1 or more, and the substituent group $R^3$ represents hydrogen or a phenyl radical, and a polymerization solvent is 2,500 ppm by weight or less.

8. A styrenic copolymer according to the mode 7 as described above, wherein the glass-transition temperature (Tg) of said styrenic copolymer is in the range of 105° C. to 140° C., the weight-average molecular weight (Mw) is in the range of 50,000 to 300,000, and the ratio (Mw/Mn) of the weight-average molecular weight (Mw) to the number-average molecular weight (Mn) is in the range of 1.6 to 2.5.

9. A method of producing, by a continuous living polymerization method, a styrenic copolymer comprising an isopropenyl aromatic unit represented by the formula (1):

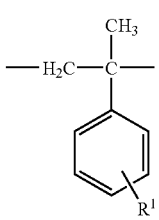

wherein the substituent group $R^1$ represents hydrogen, or a hydrocarbon radical of —$C_nH_{2n+1}$ wherein n is an integer number of 1 or more, and a vinyl aromatic unit represented by the formula (2):

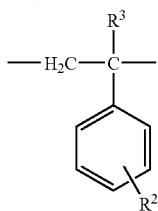

wherein the substituent group $R^2$ represents hydrogen, or a hydrocarbon radical of $-C_nH_{2n+1}$ wherein n is an integer number of 1 or more, and the substituent group $R^3$ represents hydrogen or a phenyl radical, said method comprising the steps of:

continuously introducing a raw material liquid comprising monomers and a solvent into a vessel type of reactor having a stirring machine from the lower or upper part of said reactor; and producing said styrenic copolymer while continuously discharging a polymeric solution from the upper or lower part of said reactor, which is positioned in the opposite direction of the inlet of said raw material solution.

10. A method of producing, by a continuous living polymerization method, a styrenic copolymer comprising an isopropenyl aromatic unit represented by the formula (1):

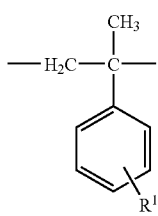

wherein the substituent group $R^1$ represents hydrogen, or a hydrocarbon radical of $-C_nH_{2n+1}$ wherein n is an integer number of 1 or more, and a vinyl aromatic unit represented by the formula (2):

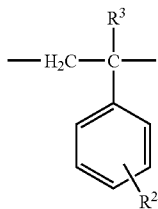

wherein the substituent group $R^2$ represents hydrogen, or a hydrocarbon radical of $-C_nH_{2n+1}$ wherein n is an integer number of 1 or more, and the substituent group $R^3$ represents hydrogen or a phenyl radical, wherein the main component of a polymerization solvent is at least one aliphatic hydrocarbon compound.

11. A method of producing, by a continuous living anionic polymerization method, a styrenic copolymer comprising an isopropenyl aromatic unit represented by the formula (1):

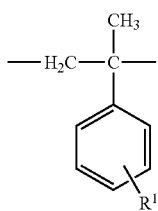

wherein the substituent group $R^1$ represents hydrogen, or a hydrocarbon radical of $-C_nH_{2n+1}$ wherein n is an integer number of 1 or more, and a vinyl aromatic unit represented by the formula (2):

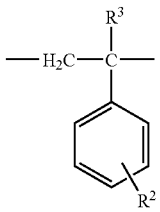

wherein the substituent group $R^2$ represents hydrogen, or a hydrocarbon radical of $-C_nH_{2n+1}$ wherein n is an integer number of 1 or more, and the substituent group $R^3$ represents hydrogen or a phenyl radical, said method comprising the step of introducing a protic compound comprising carbon dioxide and water into a polymerized solution so as to terminate the polymerization reaction, when the amount of a vinyl aromatic monomer represented by the formula (4):

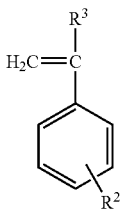

wherein the substituent group $R^2$ represents hydrogen, or a hydrocarbon radical of $-C_nH_{2n+1}$ wherein n is an integer number of 1 or more, and the substituent group $R^3$ represents hydrogen or a phenyl radical, said vinyl aromatic monomer existing in a styrenic copolymer which is produced during the polymerization reaction, has run up to 3% by weight or less.

12. An injection-molded article comprising a styrenic copolymer according to any one of the modes 1 to 8 as described above.

13. An extrusion-molded article comprising a styrenic copolymer according to any one of the modes 1 to 8 as described above.

14. A sheet comprising a styrenic copolymer according to any one of the modes 1 to 8 as described above.

15. A foam comprising a styrenic copolymer according to any one of the modes 1 to 8 as described above.

16. A food container for warming, comprising a styrenic copolymer according to any one of the modes 12 to 15 as described above.

17. A part for houses, comprising a styrenic copolymer according to any one of the modes 12 to 15 as described above.

18. A part for a car interior, comprising a styrenic copolymer according to any one of the modes 12 to 15 as described above.

19. An optical part comprising a styrenic copolymer according to any one of the modes 12 to 14 as described above.

ADVANTAGES OF THE INVENTION

A styrenic copolymer of the present invention is in particular excellent in heat resistance and weatherability, which are weak points of polystyrene, and is further excellent in melt stability, strength, rigidity and recycle properties as well, with the excellent properties of a conventional polystyrene maintained, such as transparency, dimensional stability, and molding-processing properties. Furthermore, a molded product comprising a styrenic copolymer of the present invention can be very suitably used as a food container for warming, a part for a house, a part for a car interior, or an optical part.

BRIEF DESCRIPTION OF THE DRAWINGS

In FIG. 9, the symbols "●" indicate the results of the copolymers of Examples 1, 7 and 10 and Comparative Example 1, respectively, and the symbol "×" indicates the result of Comparative Example 3.

FIG. 10 is a diagram illustrating the position of an inlet and an outlet of a polymerization reactor for producing a styrenic copolymer of the present invention (i.e., examples of the positions of the inlet and the outlet of the polymerization reactor).

BEST MODE FOR CARRYING OUT THE INVENTION

Figure 1:
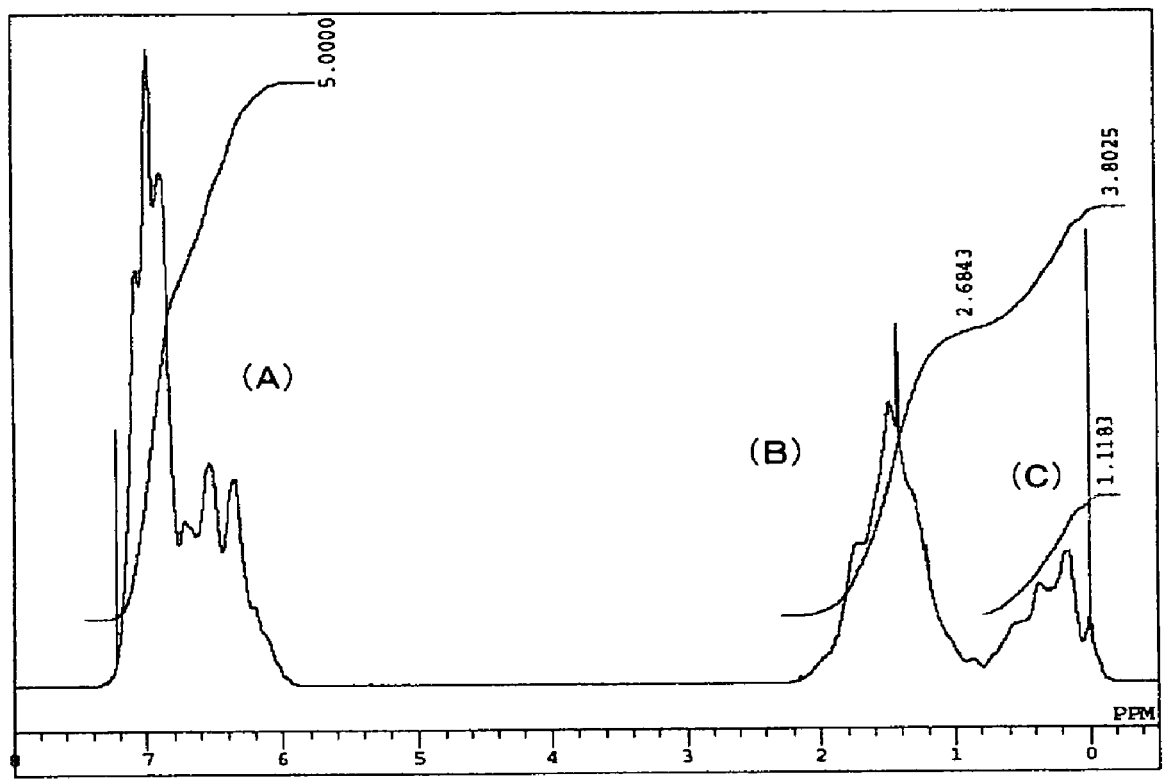
FIG. 1 is a diagram illustrating the $^1$H-NMR spectral of a styrenic copolymer of the present invention and a method of calculation to determine the content of α-methylstyrene included in the copolymer (i.e., $^1$H-NMR Chart of copolymer of styrene and α-methylstyrene). In the method of calculation, the molar content of α-methylstyrene was determined on the basis of the following formula, using the peak area (B) of methylene and methine and the peak area (C) of methyl, and thereafter converted into weight ratio. (B):(C)=(300–X):3X, wherein X is the molar content (mol %) of α-methylstyrene.

A styrenic copolymer according to the present invention and a method of producing the same will be explained below in detail.

The wording 'a copolymer comprising an isopropenyl aromatic unit (represented by the formula (1) as described above) and a vinyl aromatic unit (represented by the formula (2) as described above)' in the present invention means a copolymer produced by means of a continuous living polymerization wherein an isopropenyl aromatic monomer (represented by the formula (3) as described above) and a vinyl aromatic monomer (represented by the formula (4) as described above) are used as raw materials. A hydrocarbon radical bonding to an aromatic ring as a substituent group is a saturated hydrocarbon radical as represented by —$C_nH_{2n+1}$ wherein n is an integer number of 1 or more. A —$C_nH_{2n+1}$ radical is a saturated alkyl radical, whose structure may be a linear or branching type, and is specifically and clearly not prescribed. The upper limit of 'n' also is specifically not limited. However, it is generally in the range of $n \leq 30$. Even when a monomer comprising a saturated alicyclic hydrocarbon radical is used as a substitute for the saturated alkyl radical, it is believed that the object of the present invention can be achieved in principle. However, because the process using such a monomer has not been developed industrially, it has not been confirmed whether the object of the present invention can be achieved or not.

Examples of such compounds will be specifically enumerated. As isopropenyl aromatic monomers, for example, alkyl-substituted isopropenylbenzenes, such as isopropenylbenzene (α-methylstyrene), isopropenyltoluene, isopropenylethylbenzene, isopropenylpropylbenzene, isopropenylbutylbenzene, isopropenylpentylbenzene, isopropenylhexylbenzene, isopropenyloctylbenzene, can be enumerated. Preferred isopropenyl aromatic monomer is isopropenylbenzene.

As vinyl aromatic monomers, for example, alkyl-substituted styrene, such as styrene, p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, m-ethylstyrene, o-ethylstyrene; 1,1-diphenylethylene; and the like can be enumerated. Preferred vinyl aromatic monomer is styrene. These isopropenyl aromatic monomers and vinyl aromatic monomers may be used in one kind, respectively, or may be used in the form of a mixture of two or more, respectively. The most preferable combination is that of isopropenylbenzene and styrene.

The content of an isopropenyl aromatic unit in a styrenic copolymer is in the range of 5 to 95% by weight, preferably in the range of 7 to 90% by weight, and more preferably in the range of 9 to 80% by weight. When the content of an isopropenyl aromatic unit is less than 5% by weight, the heat resistance of the resultant styrenic copolymer can not be sufficiently enhanced. On the other hand, when more than 95% by weight, the copolymer tends to be pyrolyzed during melt molding-processing, and thus a large quantity of gas will occur during molding, whereby silver blister and/or mold deposit tend to be caused. Furthermore, the amount of monomer ingredients will be increased in the resin due to the decomposition, whereby bleedout tends to be caused onto the surface of the molded product.

In addition to the monomers as described above, other monomers which can be employed for living polymerization may be used therewith, as long as the object of the present invention is not lost. As monomers which can be copolymerized, conjugated-diene monomers such as butadiene, isoprene; alkyl methacrylates such as methyl methacrylate, ethyl methacrylate, propyl methacrylate, butyl methacrylate; acrylates such as methyl acrylate, ethyl acrylate, propyl acrylate, butyl acrylate; nitrites such as acrylonitrile, methacrylonitrile; methacrylic acid; acrylic acid; acrylic amide; vinyl ether; N-vinylpyrrolidone; and the like can be enumerated. These monomers are useful for improving or adjusting the impact strength, elongation, chemical resistance and the like of the resin.

The ratio (Mw/Mn) of the weight-average molecular weight (Mw) of a styrenic copolymer to the number-average molecular weight (Mn) thereof should be in the range of 1.6 to 4.0, preferably in the range of 1.7 to 3.7, and more preferably in the range of 1.8 to 3.5. When the value of Mw/Mn is less than 1.6, the balance between the fluidity of the resin and the mechanical properties of the resultant molded product is disturbed, whereby it is difficult to obtain sufficient performance as a resin molded product. On the other hand, when the value is more than 4.0, the fluidity is deteriorated, whereby it is difficult to form a large molded product, a thin-walled molded product, and the like.

As a scheme of controlling the Mw/Mn value, for example, controlling the revolution speed of agitating blades in a reactor according to a continuous polymerization method, can be enumerated, whereby a copolymer having a Mw/Mn value in the range of 1.6 to 2.3 can be produced. Furthermore, the Mw/Mn value can be controlled between 2.0 and 4.0 by adding a multifunctional compound to a growing end of a living polymer. Besides, the Mw/Mn value can be controlled between 2.0 and 4.0 by blending a high-molecular-weight ingredient in the form of a solution or a melt.

The wording 'a ratio (Mw/Mn) of a weight-average molecular weight (Mw) to a number-average molecular weight (Mn)' in the present invention means a value calculated in terms of polystyrene using Gel Permeation Chromatography (GPC).

Depending upon the range of the content of an isopropenyl aromatic unit in a styrenic copolymer of the present invention, which hereinafter means the percent by weight of the isopropenyl aromatic unit on the basis of the weight of the styrenic copolymer, the styrenic copolymer should satisfy the following formulae (a'):

$C \times A + 102 \leq Tg \leq D \times A + 102$ (in case of $5 \leq A < 20$), $-5.25 \times 10^{-5} A^3 + 1.09 \times 10^{-2} A^2 + 1.72 \times 10^{-1} A + E \leq Tg \leq -5.25 \times 10^{-5} A^3 + 1.09 \times 10^{-2} A^2 + 1.72 \times 10^{-1} A + F$ (in case of $20 < A \leq 60$), and $G \times A + H \leq Tg \leq I \times A + J$ (in case of $60 < A \leq 95$), wherein A: the content (% by weight) of the isopropenyl aromatic unit in the styrenic copolymer, and B: the glass-transition temperature (° C.) of the styrenic copolymer, wherein the conditions which are defined by the factors C=0.12, D=0.62, E=97, F=107, G=1.04, H=73, I=0.79, and J=98 are needed, and then the formulae (a') corresponds to the formulae (a) as described above.

In the formulae (a'), preferably C=0.15, D=0.58, E=98, F=106, G=1.03, H=74, I=0.80, and J=97, and more preferably C=0.20, D=0.52, E=99, F=105, G=1.02, H=75, I=0.81, and J=96. When the content of an isopropenyl aromatic unit in the styrenic copolymer is larger than the upper limit in the range satisfying the formulae (a'), there occurs the problem that the styrenic copolymer is deteriorated in heat stability during melting, and tends to turn yellow, and the balance between the heat resistance and the antiweatherability is disturbed. On the other hand, when less than the lower limit, the heat resistance is not sufficient.

The relationship between the content of an isopropenyl aromatic unit in a styrenic copolymer obtained according to a production method of the present invention and the glass-transition temperature does not satisfy, for example, Fox's relational expression, which has long been known.

It is disclosed that an α-methylstyrene/styrene copolymer according to a known production method satisfies Fox's relational expression (See, for example, Non-Patent Document No. 1). The reason why a styrenic copolymer obtained according to a production method of the present invention does not satisfy Fox's relational expression is not known precisely. Although we are not constrained by any theories, it is hypothesized that the reason is in part because the composition distribution of each monomer unit in a copolymer of the present invention is different from that in a known copolymer, which is caused from the difference between the production methods.

The glass-transition temperature of the present invention can be determined by means of DSC (differential scanning calorimetry), and a temperature as determined according to a method prescribed in JIS-K7121 is defined as a glass-transition temperature. In order to determine the true glass-transition temperature of a high polymer, the effect of impurities should be removed. As a method therefor, for example, a method wherein only a high-molecular weight component is split by means of gel permeation chromatography (GPC); a method wherein a dilute solution wherein a high-molecular weight polymer is homogeneously dissolved is dropped into a solvent which is indissoluble in the high-molecular weight polymer and dissoluble in the low-molecular weight impurities so as to remove the impurities; and the like can be enumerated. The glass-transition temperature of polystyrene as determined according to such a method was 102° C. If the determined glass-transition temperature of polystyrene is a different value from 102° C. due to an evaluation method, numerical values in the formulae (a') may be compensated. For example, the glass-transition temperature of polystyrene is 103° C., 1° C. is added to both sides of any case of the formulae (a') so as to compensate the formulae (a').

The content of the isopropenyl aromatic unit in a styrenic copolymer of the present invention can be determined by measuring the $^1$H-NMR of the copolymer and calculating according to the area of each of the resultant peaks.

In a use wherein a styrenic copolymer of the present invention is utilized, in particular, for example, when yellow discoloration should be inhibited, or when the content of a monomer as decomposed and generated during the melt molding of the resin should be suppressed as low as possible, the styrenic copolymer should further satisfy the following formula (b'):

$$B \leq 0.0002A^2 - 0.0017A + D$$

wherein A: the content (% by weight) of said isopropenyl aromatic unit in said styrenic copolymer, and B: the absorbance of said styrenic copolymer at 305 nm, wherein when D=0.52, the formula (b') corresponds to the formula (b) as described above.

In the formula (b') as described above, preferably D=0.51, and more preferably D=0.50. When D is more than 0.52, the resultant pellet or molded product may turn yellow to such a level as to be clearly recognized according to visual observation. Furthermore, the generation rate of monomers which are decomposed and produced from the high-molecular weight polymer during melting is remarkably increased, whereby the amount of the monomers remaining in the resultant molded product may be increased. In particular, when a biaxially oriented sheet (OPS) or an foamed sheet (PSP) as utilized in the field of food package is produced, such a sheet is wound for collecting, and thus the yellowing of the resin is remarkably conspicuous, whereby a problem in quality may be caused. Furthermore, in a use for optical parts, the yellowing means that the transmittance of light through the molded product is varied depending upon wavelength, whereby the available use is limited to a large extent. Therefore, a user for such a use is particularly sensitive to the yellowing of the resin, and thus it is one of important performance requirements to decrease the yellowing.

When a styrenic copolymer of the present invention is utilized for a resin molded-product, the styrenic copolymer should be a copolymer having a weight-average molecular weight (Mw) satisfying the following formula (c'):

$$F \times 10^{-2}A^2 + G \times 10^{-1}A + H \leq Mw \times 10^{-3} \leq \exp(J - 2.77 \times 10^{-2}A)$$

wherein A: the content (% by weight) of an isopropenyl aromatic unit in said styrenic copolymer, and Mw: the weight-average molecular weight (Mw) of said styrenic copolymer, wherein when the values of F, G, H and J are F=31 1.92, G=2.95, H=98.2 and J=6.37, respectively, the formula (c') corresponds to the formula (c) as described above.

In the formula (c') as described above, preferably, F=−2.29, G=2.77, H=112 and/or J=6.23, and more preferably, F=−2.75, G=2.20, H=131 and/or J=6.13. When the value of the weight-average molecular weight (Mw) of a styrenic copolymer is less than the value satisfying the factors of F=−1.92, G=2.95 and H=98.2 in the left side of the formula (c') as described above, the mechanical strength is decreased, and thus a sufficient performance as a resin molded product is not developed, whereby the problem of breaking and/or cracking, when a molded product is removed from a mold to produce the molded product by a molding processing as an example, tends to be caused. On the other hand, when the value of the weight-average molecular weight of a styrenic copolymer is larger than the value satisfying the factor of J=6.37 in the right side of the formula (c') as described above, the fluidity is remarkably deteriorated, whereby a large-size molded product can not be injection-molded.

The present inventor has more particularly studied the relationship between the structure of a styrenic copolymer and the properties. As a result, it has been found that the content of low molecular weight compounds with volatility remaining in the styrenic copolymer will affect the molding-processing properties and the heat resistance. On the basis of this information, the present inventor has accomplished the following invention. That is, the invention relates to a styrenic copolymer produced by a continuous living polymerization method, comprising an isopropenyl aromatic unit represented by the following formula (1):

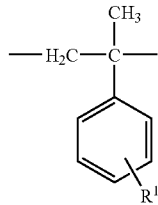

wherein the substituent group $R^1$ represents hydrogen, or a hydrocarbon radical of $—C_nH_{2n+1}$ wherein n is an integer number of 1 or more, and a vinyl aromatic unit represented by the following formula (2):

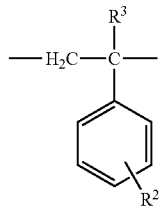

wherein the substituent group $R^2$ represents hydrogen, or a hydrocarbon radical of $—C_nH_{2n+1}$ wherein n is an integer number of 1 or more, and the substituent group $R^3$ represents hydrogen or a phenyl radical, wherein the total amount of:

an isopropenyl aromatic monomer, which remains in the styrenic copolymer, represented by the following formula (3):

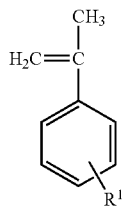

wherein the substituent group $R^1$ represents hydrogen, or a hydrocarbon radical of $—C_nH_{2n+1}$ wherein n is an integer number of 1 or more, a vinyl aromatic monomer, which remains in the styrenic copolymer, represented by the following formula (4):

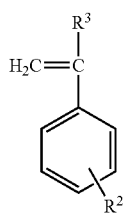

wherein the substituent group $R^2$ represents hydrogen, or a hydrocarbon radical of $—C_nH_{2n+1}$ wherein n is an integer number of 1 or more, and the substituent group $R^3$ represents hydrogen or a phenyl radical, and a polymerization solvent which remains in the styrenic copolymer is 2,500 ppm by weight or less.

Examples of hydrocarbon radicals which are included in these formulae are as enumerated on the above.

After a polymerization for a styrenic copolymer has been terminated, it is necessary to remove unreacted monomers and a polymerization solvent so as to obtain merely the copolymer. As one method therefor, there exists a method of heating-volatilization under reduced pressure. This is a method wherein a solution in which a polymerization for a styrenic copolymer has been terminated is heated so as to remove unreacted monomers and a polymerization solvent under a reduced-pressure atmosphere. The removed unreacted monomers and polymerization solvent can be recovered and recycled.

As a method of heating-volatilization under reduced pressure, specifically, for example, a method of flashing the solution into a tank under reduced pressure; and/or a method of heating and evaporating and volatilizing the solution from a vent-port under reduced pressure by means of an extruder or a kneader; or the like can be preferably utilized. Furthermore, for the purpose of an effective volatilization, a low boiling point compound such as water or alcohol may be added to the solution before the vent-port. Depending upon the volatility of a solvent, generally the temperature of the solution is controlled in the range of 180 to 300° C. and the degree of reduced pressure is controlled to 10 MPa or less so as to volatilize and remove volatile components such as residual monomers and solvent.

A method wherein devices for heating-volatilization under reduced pressure are connected in series with each other so as to arrange in the form of two or more tiers is also effective. Furthermore, a method wherein water is added to the solution between the first and the second stages so as to enhance the volatile performance of monomers and a solvent at the second stage may be also utilized. After volatile components have been removed in a flashing tank, an extruder with a vent, or a kneader may be further used so as to remove residual volatile components. After the monomers and solvent have been removed, the styrenic copolymer can be pelletized according to a known method.

The total amount of an isopropenyl aromatic monomer, a vinyl aromatic monomer and a polymerization solvent as contained in the styrenic copolymer should be controlled to 2,500 ppm by weight or less, preferably 2,400 ppm by weight or less, and more preferably 2,300 ppm by weight or less according to a method of heating-volatilization under reduced pressure. When the amount is more than 2500 ppm by weight, and variation in the heat resistance of the styrenic copolymer and variation in the fluidity of the molten resin during molding processing are remarkable, whereby it is difficult to provide a user with a stable resin in quality. In particular, depending upon the device size, the structure and the temperature conditions of a molding machine, and the like, the volatilization amount of monomers and a solvent remaining in the resin is varied. Accordingly, when the heat-resistance temperature is set to the vicinity of the limit value in performance as requested by a user, or when a highly precise part is molded, or the like, stability in quality is very important.

Furthermore, the present inventor continued to devote himself to studying. As a result, it has been found that when a styrenic copolymer has a molecular structure in a given range, and the total amount of monomers and a polymerization solvent which are included as impurities in the styrenic copolymer is 2,500 ppm by weight or less, in particular, a remarkably excellent resin molded-product can be stably produced, wherein the wording 'a molecular structure in a given range' means a molecular structure satisfying the conditions that the glass-transition temperature (Tg) of the styrenic copolymer is in the range of 105° C. to 140° C., the weight-average molecular weight (Mw) is in the range of 50,000 to 300,000, and the ratio (Mw/Mn) of the weight-average molecular weight (Mw) to the number-average molecular weight (Mn) is in the range of 1.6 to 2.5.

A specific styrenic copolymer of the present invention can particularly provide the stable production of a precision part, an optical part, an extruded sheet product, an injection-molded sheet product, a large injection-molded product or the like without a decrease in mechanical properties and/or quality.

The glass-transition temperature is preferably in the range of 106° C. to 138° C., and more preferably in the range of 107° C. to 136° C. When the temperature is lower than 105° C., it is difficult to differentiate the heat resistance from that of polystyrene. On the other hand, when the temperature is higher than 140° C., a processing area between the decomposition temperature of the high-molecular-weight product and the plasticizing temperature of the resin is narrowed down, and the generation amount of monomers due to the decomposition of the styrenic copolymer during processing is increased, and further a mold deposit and/or a silver blister tend to be caused, and the heat resistance of a molded product tends to be lowered.

The weight-average molecular weight (Mw) is in the range of 50,000 to 300,000, preferably in the range of 60,000 to 290,000, and more preferably in the range of 70,000 to 280,000. When the Mw is lower than 50,000, the mechanical strength is rapidly decreased, whereby when the copolymer is utilized as a structural material, the use is largely restricted. On the other hand, when the Mw is higher than 300,000, the melt viscosity of the resin is increased, whereby the fluidity of the resin during molding is decreased. As a result, it is difficult to mold a precise part, as well as the molecular orientation of the polymer chains is facilitated, whereby there occur various problems that the optical anisotropy is emerged; that an extruded sheet product and an injection-molded sheet product are decreased in surface impact strength; and further that it is difficult to mold a large molded product.

Besides, the ratio Mw/Mn of the weight-average molecular weight (Mw) of said styrenic copolymer to the number-average molecular weight (Mn) should be in the range of 1.6 to 2.5, preferably in the range of 1.65 to 2.45, and more preferably in the range of 1.70 to 2.40. When the Mw/Mn is lower than 1.6, a balance between the fluidity and the mechanical properties of the resin is upset, whereby it is difficult to bring out sufficient performance as a resin molded product. On the other hand, when the Mw/Mn is larger than 2.5, the fluidity is bad, whereby effects similar to when the molecular weight of the copolymer is excessively raised are shown: that is, there occur various problems that it is difficult to mold a precise part; that the optical anisotropy is emerged; that an extruded sheet product and an injection-molded sheet product are decreased in surface impact strength; and further that it is difficult to mold a large molded product.

The present inventor has found the characteristics (i) that an AB-type or ABA-type block copolymer wherein the polymer chain comprising of a vinyl aromatic unit exists in the initial end and/or the terminal end of the block copolymer, wherein 'A' represents a single polymer component mainly comprising a vinyl aromatic unit, and 'B'represents a random copolymer component comprising an isopropenyl aromatic unit and a vinyl aromatic unit, is equal to a random copolymer in performance such as heat resistance, heat stability, mechanical properties, and fluidity; and (ii) that such a block copolymer is remarkably excellent in compatibility with a single polymer having the same structure as that of a vinyl aromatic unit which is one component of the block copolymer. When it is desired that a styrenic copolymer of the present invention is reused as a recycling material, bringing out the characteristics as described above, for example, when it is desired that the styrenic copolymer is melt-kneaded with polystyrene for reuse, a copolymer wherein a polystyrene chain(s) is blocked in the terminal(s) of the high-molecular chain of the copolymer can be utilized.

The length of block chain of the vinyl aromatic unit is especially not limited, but preferably the number-average molecular weight of the block chain portion is in the range of 1,000 to 300,000. Furthermore, the Mw/Mn of a block component comprising the vinyl aromatic unit is preferably in the range of 1.0 to 2.5.

The ratio (Mw/Mn) of [the weight-average molecular weight (Mw) of a styrenic copolymer having a vinyl aromatic unit as a block component] to [the number-average molecular weight (Mn) thereof] should be in the range of 1.6 to 4.0, preferably in the range of 1.7 to 3.7, and more preferably in the range of 1.8 to 3.5. When the Mw/Mn value is lower than 1.6, a balance between the fluidity and the mechanical properties of the resin is upset, whereby it is difficult to bring out sufficient performance as a resin molding product. On the other hand, when the value is higher than 4.0, the fluidity is bad, whereby it is difficult to mold a large molded product, a thin-walled molded product, and the like.

In a method of producing a styrenic copolymer having a vinyl aromatic unit as a block component, first of all, a single polymer comprising a vinyl aromatic unit(s) is produced by means of a batch-type reactor, a continuous tube-type reactor, a continuous reactor of static mixer type, a continuous vessel type of reactor with agitating blades, a continuous coil-type reactor, or the like. Consequently, an isopropenyl aromatic monomer, a vinyl aromatic monomer, and the living single polymer comprising the vinyl aromatic unit(s) are fed into a continuous vessel type of reactor with agitating blades so as to be copolymerized, whereby an AB-type block copolymer can be produced. When an ABA-type block copolymer is produced, the AB-type block copolymer is produced, followed by living polymerization with a vinyl aromatic unit in another reactor so as to produce the ABA-type block copolymer. Otherwise the AB-type living copolymer is produced, followed by, for example, adding thereto a bifunctional compound which can react with a living growing species in another reactor so as to produce the ABA-type block copolymer.

A style of bonding an isopropenyl aromatic unit and a vinyl aromatic unit in a styrenic copolymer of the present invention is not especially limited, but the most preferable bonding style is a copolymer having random bonds. Generally, when a lot of isopropenyl aromatic unit chains exist therein, the copolymer tends to be pyrolyzed. Accordingly, it is preferred to control the isopropenyl aromatic unit chains to not more than four unit chains for some uses.

Since a vinyl aromatic unit is not in danger of being compromised in heat stability even in the form of chain, it may have a long chain structure.

The present inventor has been found that with respect to a styrenic copolymer of the present invention, even when at least two styrenic copolymers different from each other in copolymerization composition ratio and/or weight-average molecular weight are blended with each other at any composition ratio, the resultant resin composition forms a complete compatible system so as to form a homogenous one phase, whereby it has performance equivalent to that of a styrenic copolymer having a homogenous composition, as produced by polymerization.

According to this information, merely provided that several types of styrenic copolymers have been prepared, quite a few types of copolymer compositions different in composition from each other can be obtained depending upon a combination of the styrenic copolymers. As a result, a molded product with desired performance can be effectively and easily obtained, which can remarkably contribute to a reduction in energy for production, and a reduction in cost. Furthermore, because such copolymer compositions can be recycled to a styrenic copolymer different in copolymerization composition, the resin can be utilized with no waste.

As a blending method, any known blending method can be employed, such as a method of blending at least two types of styrenic copolymers which are different from each other in copolymerization composition ratio and/or weight-average molecular weight, in a solution; or a method of blending the same in a molten state by means of an extruder, a kneader or the like.

A styrenic copolymer of the present invention can be produced according to a living polymerization method. The living polymerization methods include, but not limited to, a living anionic polymerization method, a living radical polymerization method, and a living cationic polymerization method. The styrenic copolymer can be produced in any method thereof. Among them, in particular, a living anionic polymerization method is preferred. Nevertheless, when a monomer having a polar group is copolymerized, a living radical polymerization method is preferred.

As the living anionic polymerization method, a known method can be used. For example, an organic lithium compound is used as an initiator. Specifically, as an organic lithium compound, n-butyllithium, sec-butyllithium, t-butyllithium, ethyllithium, benzyllithium, 1,6-dilithiohexane, styryllithium, butadienyllithium, or the like can be used. Among them, n-butyllithium and sec-butyllithium are preferred.

As a polymerization solvent, a hydrocarbon compound without any hetero atom such as oxygen or nitrogen is preferred. As the hydrocarbon compound, an aliphatic hydrocarbon compound and an aromatic hydrocarbon compound are used. In particular, an aliphatic hydrocarbon compound with no aromatic ring is preferred. As the aliphatic hydrocarbon compound, specifically, a straight-chain aliphatic hydrocarbon compound such as n-hexane, heptane, octane or nonane; an alicyclic aliphatic hydrocarbon compound such as cyclohexane or decahydronaphthalene; or the like can be enumerated. Each of these aliphatic hydrocarbon compounds may be used as a main component of a polymerization solvent, which may be a single compound, or a mixture of two or more compounds, wherein the wording 'a main component of a solvent' means a solvent occupying 50% by weight or more of the total components of the solvent. In particular, a preferred compound is cyclohexane.

The concentration of monomers as included in a raw material solution comprising the monomers and a polymerization solvent is not limited in particular, which may be determined depending upon the structure of a polymerization reactor, the rate of polymerization, and a polymerization temperature. For example, in case of living polymerization, the rate of polymerization is extremely high, and thus the concentration is preferably in the range of 5 to 50% by weight.

When it is desired to heighten the concentration of monomers in a raw material solution so as to increase productivity, it is desired to provide a polymerization reactor with a condenser so as to remove polymerization heat by utilizing the latent heat of evaporation of a solvent in order to efficiently remove polymerization reaction heat. In particular, when cyclohexane (with which n-hexane may be incorporated) is mainly employed as a polymerization solvent, since the boiling point of cyclohexane is 82° C., it is easy to control the polymerization temperature near a temperature between 80° C. to 90° C., whereby a styrenic copolymer with quality stabilized can be obtained.

The polymerization temperature is preferably in the range of 40° C. to 110° C., more preferably in the range of 50° C. to 100° C., and still more preferably in the range of 55° C. to 95° C. When the polymerization temperature is lower than 40° C., the reaction rate is decreased, whereby the temperature has no practical use for industrial production. On the other hand, when the polymerization temperature is higher than 110° C., the copolymer is remarkably yellowed, and decreased in weatherability, as well as in heat stability during melting.

A styrenic copolymer of the present invention can be produced according to a continuous living polymerization method, for example, using a complete mixing type of polymerization reactor. Otherwise a combination of a complete mixing type of polymerization reactor and a non-complete mixing type of polymerization reactor may be used. In particular, in order to obtain a random copolymer, a complete mixing type of polymerization reactor is preferred. The wording 'a complete mixing type of polymerization' means, for example, a method of polymerize an isopropenyl aromatic monomer and a vinyl aromatic monomer by means of such a continuous complete mixing type of reactor as to make the concentration of each of the monomers and a living copolymer which exist in a system of reaction be always constant.

With respect to one of objective indicators for judging whether a polymerization reactor is a complete mixing type or a non-complete mixing type, for example, when a polymerization reaction is carried out using a styrenic monomer, and the molecular-weight distribution (Mw/Mn) of the resultant high-molecular-weight product is determined, if the Mw/Mn value is about 2, the polymerization reactor can be judged to be a complete mixing type. When a polymerization reactor in a plug flow state, i.e., a non-complete mixing type of polymerization reactor is used, the Mw/Mn value will be about 1, or a value larger than 2.

In order to achieve a complete mixing type, factors such as the shape and internal structure of a polymerization reactor, the shape of agitating blades, the revolution speed of the agitating blades, the viscosity of a polymeric solution, the arrangement of a supply port for introducing a raw material into the polymerization reactor and an exhaust port are significant.

The inventor has more particularly studied the factors. As a result, it has been found that a styrenic copolymer for achieving the object of the present invention can be produced by using a polymerization reactor having a particular structure: the relations between the inlet and the exhaust port of the polymerization reactor will be illustrated in FIG. 10. That is, a method of producing, by a living polymerization method, a styrenic copolymer comprising an isopropenyl aromatic unit represented by the following formula (1):

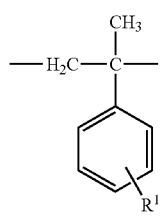

wherein the substituent group $R^1$ represents hydrogen, or a hydrocarbon radical of $-C_nH_{2n+1}$ wherein n is an integer number of 1 or more, and a vinyl aromatic unit represented by the following formula (2):

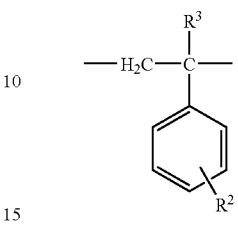

wherein the substituent group $R^2$ represents hydrogen, or a hydrocarbon radical of $-C_nH_{2n+1}$ wherein n is an integer number of 1 or more, and the substituent group $R^3$ represents hydrogen or a phenyl radical, said method comprising:

continuously introducing a raw material solution comprising monomers and a solvent into a vessel type of reactor having a stirring machine from the lower or upper part of said reactor; and producing said styrenic copolymer while continuously discharging a polymeric solution from the upper or lower part of said reactor, which is positioned in the opposite direction of the inlet of said raw material solution, has been found.

The structure of the stirring machine is not limited in particular, but is preferably such a structure as to easily generate a vertical flow. The internal structure of the stirring machine is also not limited in particular, but is preferably provided with a baffle so as to form the homogeneous phase of a polymeric solution. The amount of the polymeric solution with which the interior of a vessel-type of reactor is filled may be such a solution amount as to reveal a stirring effect by the stirring machine. It is preferably a fill in the range of 5% to 100% by volume on the basis of the volume of the reactor.

It is important that the raw material liquid comprising monomers and a solvent should be continuously introduced into the vessel-type of reactor from the lower or upper part of the reactor, and the polymeric solution should be continuously discharged from the upper or lower part of said reactor, which is positioned in the opposite direction of the inlet of said raw material solution. The wording 'the opposite direction of the inlet of said raw material solution' means the range of 90° to 270° from the center when the inlet and the exhaust port are positioned at about the same distance from a solution level as shown in example 1 of FIG. 10. Furthermore, as shown in example 2 or 3 of FIG. 10, when one of the inlet and the exhaust port is positioned near a solution level, the wording means a range near the bottom surface of the reactor. When the solution amount in the reactor is 100 vol. % of the total volume of the reactor, the wording means a range near the top or bottom surface of the reactor.

The number of polymerization reactor to be used is not necessarily limited to one, but two or more reactors may be connected to each other depending upon the purpose. Furthermore, reactors to be connected to the pre-reactor and/or post-reactor of a polymerization reactor for producing a styrenic copolymer of the present invention are not necessarily limited to a complete mixing type of polymerization reactors, but a non-complete mixing type of polymerization reactors may be used.

Because a styrenic copolymer of the present invention is produced according to a continuous living polymerization method, the styrenic copolymer can block the other polymer having a vinyl aromatic unit, bringing out the best of the features of living polymerization. Thus two or more polymerization reactors may be connected in series to each other depending upon the purpose so as to block the initial end and/or terminal end of a styrenic copolymer with a polymer having a vinyl aromatic unit.

Furthermore, all-vinyl aromatic monomers may be polymerized by means of the first polymerization reactor, and then isopropenyl aromatic monomers and vinyl aromatic monomers may be copolymerized within the second polymerization reactor so as to obtain a block copolymer of the single polymer having a vinyl aromatic unit and the copolymer of an isopropenyl aromatic unit and a vinyl aromatic unit.

The present inventor has been devoted to continue studying. Consequently, he has developed a styrenic copolymer composition comprising a mixture of at least two styrenic copolymers, which are produced by a continuous living polymerization method, comprising an isopropenyl aromatic unit represented by the formula (1) as described above, and a vinyl aromatic unit represented by the formula (2) as described above, said styrenic copolymers being synthesized by providing [an isopropenyl aromatic monomer represented by the formula (3) as described above], and [a vinyl aromatic monomer represented by the formula (4) as described above] into a polymerization reactor while the composition ratio of [said isopropenyl aromatic monomer represented by the formula (3)] to [said vinyl aromatic monomer represented by the formula (4)] in a raw material solution is continuously or intermittently changed, and each of said at least two styrenic copolymers having a composition ratio of [said isopropenyl aromatic monomer represented by the formula (3)] to [said vinyl aromatic monomer represented by the formula (4)] which is different from that of the others. The present inventor has found the characteristics of such a styrenic copolymer composition that the styrenic copolymer composition is equivalent to a random copolymer in performance such as heat resistance, heat stability, mechanical properties and fluidity; and that it is remarkably compatible with a polymer having a vinyl aromatic unit as a main component.

This suggests that when a molded product of the styrenic copolymer composition is used as a recycling material, the molded product can be blended with a polymer having a vinyl aromatic unit as a main component, such as polystyrene, so as to be reused. The wording 'copolymers different from each other in composition ratio' herein means copolymers which are different from each other in glass-transition temperature by at least 3° C. due to the difference in composition ratio.

The wording 'providing an isopropenyl aromatic monomer and a vinyl aromatic monomer into a polymerization reactor while the composition ratio of said isopropenyl aromatic monomer to said vinyl aromatic monomer in monomers is continuously or intermittently changed' means that the concentration of each of monomers as introduced into a polymerization reaction system is continuously or intermittently changed. As a result, the composition ratio of the aromatic monomers of the resultant styrenic copolymer is continuously changed, whereby a styrenic copolymer composition comprising at least two styrenic copolymers each of which is different from the other in constitutional composition ratio can be sequentially produced.

The styrenic copolymer composition comprising two or more styrenic copolymers each of which is different from the other in constitutional composition ratio may be mixed in solution in a batch-type vessel, followed by flashing into a heated tank under reduced pressure so as to remove a solvent, or otherwise followed by removing the solvent by means of an extruder or a kneader, whereby a styrenic copolymer composition in pellet can be recovered. Otherwise without keeping the styrenic copolymer composition in solution in the batch-type vessel, the composition may be recovered in pellet as it is, and the resultant pellets can mixed and homogenized in a batch-type or continuous-type of mixing vessel. Otherwise the pellets may be homogenized in the mixing vessel, followed by melt-mixing further using an extruder.

An example for the production of a specific styrenic copolymer composition will be enumerated. A raw material of an isopropenyl aromatic monomer (M1) and a vinyl aromatic monomer (M2), wherein the composition ratio M1/M2 (% by weight) is 50/50, is fed into a reactor so as to be polymerized, and thereafter the raw material is changed for a raw material having a different composition ratio such as M1/M2=40/60 (% by weight), and successively the new raw material is introduced into the reactor so as to be polymerized. Such a change in composition ratio will be referred to as 'the composition of a raw material has been intermittently changed'. When the monomers are polymerized in this manner, a copolymer composition comprising copolymers which are changed sequentially in composition from the composition of a copolymer as produced by polymerization at M1/M2=50/50 (% by weight) to the composition of a copolymer as produced by polymerization at M1/M2=40/60 (% by weight). The produced copolymer composition is mixed in solution in a batch-type of vessel or otherwise agitated and mixed in pellet, followed by kneading in melt so as to obtain a copolymer composition having a certain composition.

A styrenic copolymer composition as produced in this manner can be considered as a mixture of copolymers comprising an isopropenyl aromatic unit component and a vinyl aromatic unit component, wherein each of said copolymers is different from the other in composition ratio of [the isopropenyl aromatic unit component] to [the vinyl aromatic unit component]. The styrenic copolymer composition as thus produced is remarkably compatible with a single polymer of a vinyl aromatic monomer, and can maintain its transparency without causing a decrease in mechanical properties. Thus it has been found that the styrenic copolymer composition can serve many uses as a recycling material.

In a living anionic polymerization method, which is a typical example of a method of producing a styrenic copolymer of the present invention, the termination of a polymerization reaction is preferably carried out when the amount of a residual vinyl aromatic monomer existing in the styrenic copolymer has been 3% by weight or less, and preferably 1% by weight or less. An isopropenyl aromatic monomer may be remained in the system of reaction. If the polymerization reaction has been terminated when the amount of a residual vinyl aromatic monomer is larger than 3% by weight, the amount of a residual vinyl aromatic monomer remaining in the polymer is excessive when the copolymer is recovered, whereby the vinyl aromatic monomer may be generated as a gas during molding processing, which may cause, for example, a problem with mold-deposit and the like.

As a terminator used when a polymerization reaction is terminated, a protic compound having an oxygen-hydrogen bond, such as water, alcohol, phenol, or carboxylic acid; or a protic compound having a nitrogen-hydrogen bond, such as amine; can be enumerated. Additionally, an epoxy compound, an ester compound, a ketone compound, a carboxylic anhydride, an amide compound, a compound having a carbon-halogen bond, or the like may also be used with, a similar effect. These compounds may be added by separating into two stages. For example, an epoxy compound may be added to the system of reaction so as to terminate a polymerization reaction, and thereafter water may be added thereto.

The amount of a polymerization-terminating compound to be used is preferably in the range of from an amount corresponding to the equivalent weight of growing species to an amount corresponding to about ten times the equivalent weight. An excessive amount thereof is disadvantageous in costs, as well as the incorporation of additives remaining in the system of reaction into the resultant copolymer frequently causes disadvantages.

The present inventor has found that protic compounds having a nitrogen-hydrogen bond and/or an oxygen-hydrogen bond, which comprises carbon dioxide and water, in conventionally known polymerization terminators, are excellent as a polymerization-reaction terminator. When this terminator is used so as to terminate a polymerization, the yellowing properties of the resultant copolymer when the copolymer is molded in melt is remarkably improved, whereby an opportunity to utilize the copolymer for uses wherein the yellowing comes in to question, such as a use for a food packaging, and a use for an optical part, will be increased.

A living growing species can be subjected to a coupling reaction with a multifunctional compound so as to increase the molecular weight of a polymer, and further to form a branched structure from polymer chains. The multifunctional compound as used for such a coupling reaction can be selected from known multifunctional compounds. As the multifunctional compound, a polyhalogenated compound, a polyepoxy compound, a mono- or poly-carboxylate, a polyketone compound, a mono- or poly-carboxylic anhydride, or the like can be enumerated. As a specific example, silicon tetrachloride, di(trichlorosilyl)ethane, 1,3,5-tribromobenzene, epoxidized soyabean oil, tetraglycidyl 1,3-bisaminomethylcyclohexane, dimethyl oxalate, trimellitic tri-2-ethylhexyl, pyromellitic dianhydride, diethyl carbonate, or the like can be enumerated.

An alkali component from an organic lithium compound as a polymerization initiator, such as alkoxylithium, aminolithium, or lithium hydroxide, may be neutralized and stabilized by adding an acid compound thereto. As examples of such an acid compound, a mixture of carbon dioxide and water as described above, boric acid, various carboxylic compounds, and the like can be enumerated. One of these compounds may be dissolved in the same solvent as a polymerization solvent, followed by addition to a polymer solution after a polymerization has been terminated. This addition may improve resistance to coloration in particular.

If necessary, a known compound as used for a styrenic resin in order to improve the heat stability, the mechanical stability, the fluidity and the tinting can be added to a styrenic copolymer of the present invention.

For example, as a primary antioxidant, 2,6-di-t-butyl-4-methylphenol, triethyleneglycol-bis-[3-(3-t-butyl-5-methyl-4-hydroxyphenyl)propionate], pentaerythritoltetrakis-[(3,5-di-t-butyl-4-hydroxyphenyl)propionate], octadecyl-3-(3,5-di-t-butyl-4-hydroxyphenyl)propionate, 1,3,5-trimethyl-2,4,6-tris(3,5-di-t-butyl-4-hydroxybenzyl)benzene, n-octadecyl-3-(3,5-di-t-butyl-4-hydroxyphenyl)propionate, 2-t-butyl-6-(3-t-butyl-2-hydroxy-5-methylbenzyl)-4-methylphenylacrylate, 2[1-(2-hydroxy-3,5-di-t-pentylphenyl)]-4,6-di-t-pentylphenylacrylate, tetrakis[methylene-3-(3,5-di-t-butyl-4-hydroxyphenyl)propionate]methane, 3,9-bis[2-{3-(t-butyl-4-hydroxy-5-methylphenyl)propinyl-oxy}-1,1-dimethylethyl]-2,4,8,10-tetraoxa[5,5]undecane, 1,3,5-tris(3',5'-di-t-butyl-4'-hydroxybenzyl)-s-triazin-2,4,6-(1H,2H,3H)-trione, 1,1,4-tris(2-methyl-4-hydroxy-5-t-butylphenyl)butane, 4,4'-butylidenebis(3-methyl-6-t-butylphenol), or the like can be enumerated.

Furthermore, a phosphorus antioxidant or a sulfur antioxidant as a secondary antioxidant, a stabilizer for a hindered amine as a weathering agent, and/or an ultraviolet absorber can be also added thereto. As other additive agents, a plasticizer such as mineral oil; a lubricant such as a long-chain aliphatic carboxylic acid and/or a metallic salt thereof; an organic dye and an organic pigment for improve the tinting; can be added thereto.

An anthraquinone organic dye to improve the tinting of the copolymer decreases the heat resistance of the copolymer only a little, and thus is preferred in particular.

A silicone or fluorine-contained mold releasing agent, and/or a silicone or fluorine-contained antistatic agent, and the like can be used by applying known techniques as utilized for styrenic resins thereto.

These stabilizers can be added in a polymer solution after polymerization has been completed so as to mix therewith, or otherwise can be melt-mixed with the copolymer by means of an extruder after polymers have been collected.

Furthermore, if necessary, a styrenic copolymer of the present invention can be mixed with other known polymer(s), as long as the properties of the styrenic copolymer are not lost. As examples of the known polymer(s), polystyrene (GPPS); high-impact polystyrene (HIPS); a styrenic copolymer such as acrylonitrile-styrene copolymer (AS), an acrylonitrile-styrene copolymer containing rubber particles (ABS), polymethylmethacrylate (PMMA), methyl methacrylate-styrene copolymer (MS), styrene-alkylacrylate copolymer, styrene-methacrylic acid copolymer (SMAA), styrene-maleic anhydride copolymer (SMA), a styrene-conjugated diene block polymer, and its hydrogenated product, a styrene-conjugated diene random copolymer, and its hydrogenated product; and polyphenylene ether; can be enumerated.

A method of mixing a resin composition of the present invention is not specifically limited. A mechanical mixing method by means of various-types of processing machinery such as a kneader, Banbury mixer or an extruder; or a solution mixing method wherein the resin composition is dissolved in a solvent; can be utilized.

As a method of processing a styrenic copolymer of the present invention, a melt processing method wherein the styrenic copolymer can be mass-produced at a lower cost is preferred: e. g., injection molding, extrusion molding, foam extrusion molding, blow molding, or the like can be suitably used. As obtainable molded-products, an injection-molded product, a sheet and a molded sheet product, a film, a foamed sheet and a foamed molded sheet product, a foamed board, and a blow molded product can be enumerated, which may be utilized as a structural material, a container, an equipment component, and the like, wherein transparency, heat resistance, weatherability, and high rigidity are required.

A styrenic copolymer of the present invention is excellent in melt stability, and thus the amount of monomers as generated due to the decomposition of the high-molecular weight product during processing is remarkably small. Therefore, the amount of volatile components such as monomers, which are included as impurities in a molded product, is remarkably small, whereby the molded product can be suitably utilized as a food-packaging container, a part for houses, a part for a car interior, or the like.

As specific examples as a food-packaging container, a container for a box lunch and a lid for a lunch box, in which the lunch may be eaten after warming by means of an electronic oven, can be enumerated.

A biaxially oriented sheet of a conventional styrenic resin such as polystyrene (GPPS) is utilized as a lid for a lunch box. However, when some contents in a lunch box are warmed by means of an electronic oven, the lid may be partially deformed, and thus there has existed the problem that the fit of the container to the lid is loosened when the deformation is caused whereby hot contents may leak out of the container. However, because the heat resistance of a styrenic copolymer of the present invention is higher than the boiling point of water, the deformation of a lunch box is not caused at all due to warming with hot water or due to warming by means of an electronic oven, and thus the lunch box can be utilized easily.

As a conventional container for a box lunch, capable to be warmed by means of an electronic oven, a resin-composition sheet comprising propylene and an inorganic filler such as talc has been utilized. However, because the sheet is conducts heat easily, there has existed a danger of causing heat injury when the box-lunch container is taken out from the electronic oven. Furthermore, there has also existed the problem that because the container includes the inorganic filler, it is heavier, and a large quantity of ashes are generated when it is burned.

The present inventor has found that the utilization of a foamed sheet of a styrenic copolymer of the present invention can solve conventional problems with a food container capable of being warmed by means of an electronic oven once and for all. That is, as a result of employing the foamed sheet, the weight saving of the food container can be achieved; even if the container is picked up with bare hands after being warmed, there is no need to worry about heat injury, due to the high heat insulating properties of the foamed sheet; and furthermore, the temperature of contents in the lunch box is slowly decreased, whereby hot cooking can be maintained for a long time. Additionally, the container can be also recycled as a resin material; and even when the container is thermally disposed, very little ash is generated. Accordingly, a styrenie copolymer of the present invention can be said to be a material which is a remarkably energy-friendly and environment-friendly.

Depending upon contents in the lunch box, if necessary, the surface of the foamed sheet may be laminated with a film of a crystalline polymer such as polyethylene, polypropylene, polyester or polyamide. In order to enhance bond performance between the laminated film and the foamed sheet, a block polymer of a styrenic polymer and a polyolefin; a block polymer of polyester or polyamide, and a polymer containing a styrenic polymer component; or a graft polymer of polyester or polyamide, and a polymer containing a styrenic polymer component; can be incorporated in the laminated film, as one component thereof.

The part for houses as described above includes a foamed board and the like as positioned between room space and an external wall for the purpose of heat insulation. The part for a car interior as described above includes a foamed sheet or foamed board as positioned between a car interior and a metallic body for the purpose of heat insulation, sound absorption or sound deadening.

There has existed the problem that a small amount of organic compounds as volatilized from a resin molded-product tends to be accumulated in the air in an enclosed space such as the room inside of a conventional house or the interior of a car. In particular, the roof of a house or the top of a car, the temperature of which is regionally elevated by solar heat, is also requested to be a higher heat-resistance material.

A foamed sheet or foamed board of a styrenic copolymer of the present invention is a material which can solve the problems as described above, and can satisfy performance requirements from a user.

A styrenic copolymer of the present invention is a material which is excellent in transparency, heat resistance, weatherability, dimensional stability, and rigidity, and thus can be suitably utilized as an optical part. As the optical part, for example, a light guiding plate, a diffusion plate, a reflecting plate, a reflecting film, an antireflection film, a polarizing plate, a polarizing film, a retardation film, a lens, a Fresnel lens, or the like can be enumerated. The large-sizing of a liquid-crystal display and a projector requires these optical parts being higher in dimensional stability and workability than conventional parts. Furthermore, because these optical parts are used near a light source, a higher value has been given to the light resistance and the heat resistance thereof. A styrenic copolymer of the present invention is an excellent material which can solve the conventional problems once and for all, and can satisfy future performance needs, and further it can be expected to have a lot of applicable uses in addition to various uses as a food-container for warming, a part for houses, a part for a car interior, and an optical part.

EXAMPLES

The modes of the present invention will be specifically explained illustrating working examples and comparative examples as follows. However, these modes are examples, and are intended not to limit the scope of the present invention at all.

Analyses, evaluation methods, and conditions for physical properties, as employed in the working examples and comparative examples are as follows:

[Analytical Procedure for Physical Properties]

(1) Rate of Conversion (Conv.)

A rate of conversion was determined by means of a gas chromatography (GC: Shimadzu Corp., GC-14B, Detector is FID). As a column, 'ULBON HR-1, with an inner diameter of 0.32 mm, a film thickness of 0.25 μm, and a length of 30 m (SHIMADZU GLC Ltd.)' was used. As a measurement condition, the temperature was elevated from 50° C. to 80° C. at a rate of 10° C./min, and maintained at 80° C. The rate (%) of conversion was calculated using a peak area of each of styrene and α-methylstyrene, and a peak area of cyclohexane, which was used as an internal standard material.

(2) Molecular Weight (Mn, Mw, Mw/Mn)

A molecular weight was determined by means of a GPC device with two columns (TSKgel GMHXL, 40° C.) connected to HLC-8020 (Tosoh Corp.), and with an RI detector. As a moving phase, chloroform containing 2% by weight of ethanol was used. Polystyrene standards (Tosoh Corp.) were used so as to make an analytical curve, and then the molecular weight was calculated in terms of polystyrene.

(3) Glass-Transition Temperature (Tg)

0.1 g of a polymer was dissolved in 5 g of toluene, and the resultant solution was dropped in 20 ml of methanol at a rate of 0.2 ml/sec. The resultant precipitate was filtered and recovered. This operation was repeated two times, and the resultant polymer was air-dried, followed by drying at a temperature of 160° C. in a vacuum for an hour. The Tg (° C.) of the resultant polymer was determined by means of DSC-7 (Perkin-Elmer Corp.) according to JIS-K-7121. Specifically, the polymer was elevated from room temperature to a temperature of 250° C. at a rate of 10° C./min in an atmosphere of nitrogen, followed by returning back to room temperature at a rate of 10° C./min, and thereafter again elevated to a temperature of 250° C. at a rate of 10° C./min. A glass-transition temperature as measured at the second temperature-rising step was determined as the Tg (° C.).

(4) Content of α-MethylStyrene in Styrenic Copolymer

The content of α-methylstyrene in a styrenic copolymer was determined by means of NMR (DPX-400) of BRUKER Corp. An 1H-NMR from the styrenic copolymer was measured, and then the content (% by weight) of α-methylstyrene in the styrenic copolymer was calculated from the ratios between the peak areas of methyl, methylene and methine. A detailed calculation method is illustrated in FIG. 1.

(5) Absorbance (B)

The absorbance of the molded product (which is a difference in absorbance between a molded product and the air) was determined at wavelength of 305 nm by means of a spectrophotometer (U-3210, Hitachi, Ltd.).

(6) Yellowness Index (YI)

A yellowness index (YI) was determined by means of a Color Tester (SUGA TEST INSTRUMENTS K.K.) according to ASTM D1925.

(7) Content of Each of Small Amount of Monomers and Cyclohexane in Resin

The content of each of small amount of monomers and cyclohexane in a resin was measured by means of GC-MS of Shimadzu Corp. under the following conditions:

Equipment: GC-2010, MS-QP2010, with a head space sampler,

Column: Rtx-1, 0.25 mm, 1.00 μm, 60 m (SHIMADZU GLC Ltd.)

Temperature Conditions: The resin was maintained at a temperature of 60° C. for two minutes, and then elevated to a temperature of 145° C. at a rate of 10° C./min, followed by elevation to a temperature of 160° C. at a rate of 3° C./min.

Preparation of Test Samples: 0.4 g of a polymer was put in a dedicated vial, and then 10 ml of DMF and 1 ml of a chloroform including an internal standard (n-nonane) were added thereto, and the vial was hermetically sealed, and thereafter the sample was dissolved. Then the content (ppm by weight) of each of small amount of monomers and cyclohexane in the resin was measured.

An analytical curve was made using styrene, α-methylstyrene and cyclohexane.

[Injection Molding Method]

The resin was molded by means of an injection machine (AUTO SHOT 15A) of FUNAC Ltd. make under the following conditions: A cylinder temperature was set at a temperature of 215° C., 225° C., 230° C., 230° C. from the side of a hopper. A mold temperature, an injection time, and a cooling time were set to 60° C., 10 seconds and 20 seconds, respectively. A mold was filled with a molten resin by applying to the mold an injection pressure higher by 5 MPa than that at which the mold can be just filled with the resin.

Dumbbell specimens and strip specimens having a thickness of 3 mmt, as prescribed in ASTM No.4, were molded, and used as samples for a tensile test, a bending test, a determination of absorbance, a determination of yellowness index, a determination of Vicat temperature, and a weatherability test.

[Extrusion Compound Method]

A resin composition was molded by means of a biaxial extruder (Technobel Corp.) having a diameter of 15 mm. A cylinder temperature of 220° C. (provided that a temperature below the hopper is 110° C.), a screw speed of 200 rpm, and a discharge rate of 1.9 kg/hour were employed.

[Extrusion Sheet Molding Method]

A T-slot die having a thickness of 1 mm and a width of 3 cm was installed at the outlet portion of a biaxial extruder (Technobel Corp.) having a diameter of 15 mm, and a resin was extruded in the form of sheet, and thus a sheet was formed. A cylinder temperature of 220° C. (provided that a temperature below the hopper is 110° C.) was employed.

[Extrusion Foam Molding Method]

Talk as a nucleating agent was mixed with resin pellets, and the blend was introduced into a hopper of a first-stage extruder, followed by heat plasticization at a temperature of about 220° C. to 250° C. Thereafter, about 4% by weight of butane was pressed and impregnated into the plasticized product. The resultant product was fed into a second-stage extruder, followed by a temperature control to a viscosity suitable for foaming. The resultant product was extruded from dies having a temperature of about 130° C. so as to form a foamed sheet of a styrenic copolymer. The average thickness of the foamed sheet was set to about 2.5 mm, and the average foam-magnification was set to about ten times.

The resultant foamed sheet of a styrenic copolymer was sufficiently aged, followed by an evaluation for heat resistance as a foamed sheet.

[Evaluation Method for Physical Properties]

(1) Evaluation for Heat-Stability in Melt-1

1 g of a polymer was put in a test tube, which was filled with nitrogen and sealed. The test tube was put in an oil bath, which was heated so that the bulk temperature of the test tube could be elevated to a temperature of 280° C. The bulk temperature was maintained for a predetermined period of time, provided that the time when the bulk temperature has attained to a temperature of 280° C. is zero minute. Subsequently, the bulk temperature was returned back to room temperature, and 25 ml of a chloroform including an internal standard was put in the test tube so as to dissolve the polymer, and thereafter the content (ppm by weight) of styrene was determined.

(2) Evaluation for Heat-Stability in Melt-2

Resin pellets were retained in melt within a cylinder of an injection machine at a given temperature for a given period of time, followed by injection molding into strip specimens as prescribed in ASTM No. 4. A temperature at which a silver blister is caused on the surface of each of the strip specimens, and a time when the silver blister is caused thereupon were determined. The occurrence of the silver blister was visually observed.

(3) Tensile and Bending Tests

Tensile strength (MPa), tensile elongation (%), flexural strength (MPa), and elastic modulus in bending (MPa) were measured by means of AUTO GRAPH (AG-5000D) of Shimadzu Corp. under the following conditions.

Tensile Test: Chuck Distance of 64 mm, Elastic Stress Rate of 5 mm/min, and

Bending Test: Span Distance of 50 mm, Bending Rate of 1.3 mm/min (4) Measurement of Vicat Temperature A Vicat Temperature was determined according to ISO-306 using dumbbell specimens having a thickness of 3 mm, which had been molded by an injection molding process.

(5) Evaluation for Weatherability

Figure 8:
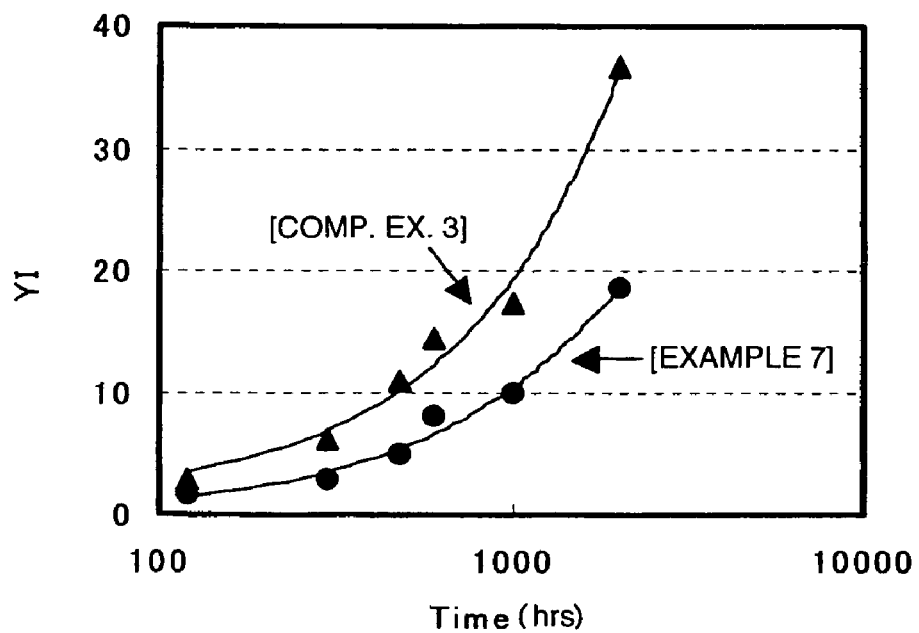
FIG. 8 illustrates the results of weatherability tests for a styrenic copolymer of the present invention and a polystyrene (i.e., the results of the weatherability tests).

Ultraviolet rays from carbon arcs at a temperature of 63° C. were irradiated on samples, and then the YI value of each of the samples was determined after a given period of time. This corresponds to a method of measuring a YI value as shown in FIG. 8 as described hereinafter.

Figure 9:
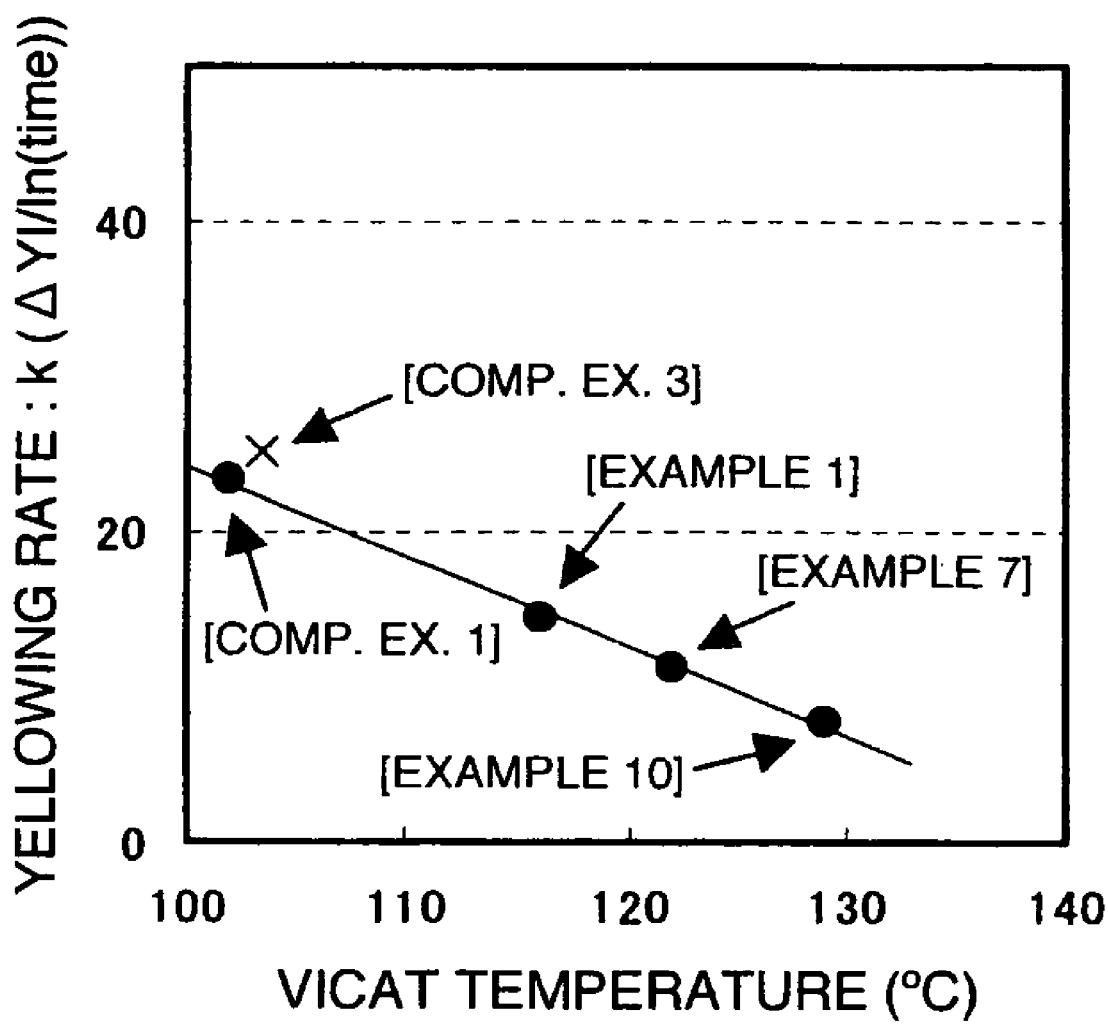
FIG. 9 is a diagram illustrating the relationship between [the heat resistance of a styrenic copolymer of the present invention] and [the yellowing rate] (i.e., the relationship between [the vicat temperature of the copolymer of styrene and α-methyl styrene] and [the yellowing rate]).

Furthermore, as an acceleration test method, samples were evaluated under a continuous irradiation condition (at a wavelength of 295 to 450 nm) at a temperature of 63° C. by means of an Eye-Super UV tester (Type-SUV-F11, of EYEGRAPH-ICS CO., LTD.), and then the YI value of each of the samples was determined after a given period of time. This corresponds to a method of measuring a YI-value as shown in FIG. 9 as described hereinafter.

Example 1

<Raw Material>

A solution of styrene (St; SUMITOMO CHEMICAL CO., LTD.), α-methylstyrene (α-MeSt; Mitsui Chemicals, Inc.) and cyclohexane (CH; IDEMITSU PETROCHEMICAL CO., Ltd.), wherein styrene (St), (α-methylstyrene (α-MeSt) and cyclohexane (CH) are mixed with each other at a rate of St(% by weight)/(α-MeSt(% by weight)/CH(% by weight)= 27/18/55, was stored in a storage tank, followed by bubbling with nitrogen. Thereafter, the solution was passed through the interior of a 5-liters volume refinery tower as filled with an activated alumina (KHD-24 of SUMITOMO CHEMICAL CO., LTD.) so as to remove t-butylcatechol, which is a polymerization inhibitor.

<Initiator> n-butyllithium (a solution of 15% by weight of n-butyl-lithium in n-hexane, of Wako Pure Chemical Industries, Ltd.) was diluted with cyclohexane to 1/51 time.

<Terminator>

A solution of methanol (with highest quality, of Wako Pure Chemical Industries, Ltd.) and cyclohexane, wherein methanol was diluted with cyclohexane so that a 3% by weight concentration of methanol could be obtained, was prepared. Thereafter, carbon dioxide and a small amount of water were blown into the solution until the solution are saturated with the same.

<Production Method>

As a polymerization reactor, a 3.4-liter jacketed reactor (R1) which is provided with agitating blades (MAXBLEND of Sumitomo Heavy Industries, Ltd.) and a condenser, and further provided with a nozzle for introducing a raw material, a nozzle for introducing an initiator, and a nozzle for discharging a polymerized solution, was used. The outlet of the condenser was sealed with a nitrogen gas so that the air could not to be incorporated from the outside. The volume of a polymerization solution in the polymerization reactor was controlled always to be 2.1 liters. A polymerization solution was maintained in a state wherein a portion of the solution is always boiled, the bulk temperature was controlled to be a temperature between 82° C. to 84° C. The rotating speed of the agitating blades was set to be 175 rpm. A gear pump was provided for each of the inlet for the raw material and the outlet of the polymerization reactor, whereby each of the raw material and the polymerization solution was controlled so that it could be flowed at a constant flow rate of 2.1 litters/hour. Furthermore, the solution of the initiator was introduced into the polymerization reactor at a rate of 0.25 litter/hour. The relationship between the inlet for the raw material and the outlet for a polymer solution of the polymerization reactor was in the completely opposite direction to each other as shown in FIG. 10, and the inlet for the raw material was provided in the lower position, while the outlet was provided in the position of 5 cm below the liquid level.

A living polymer solution as discharged from the polymerization reactor was introduced through a piping having a diameter of 10 mm to the inlet for a solution of a polymerization terminator by using a gear pump. The length of the piping from the reactor to the point wherein the terminator was mixed was about 2 m, and the piping was kept warm at a temperature of 65 to 70° C. The solution of the terminator was introduced into the polymerization solution at a flow rate of 0.1 kg/hour, and thereafter passed through a 1.2-litters volume static mixer (SMX-type, of Sulzer Corp.) so as to completely terminate the polymerization reaction. The polymer solution was further heated to a temperature of 260° C. by means of a pre-heater, followed by flashing into an about 50-liter container which had been warmed to a preset temperature of 260° C. under a reduced pressure of 2 MPa, whereby the solvent and unreacted monomers were separated from the polymer and recovered. The temperature of the polymer in the flashing container was about 240 to 250° C., and the retention time of the polymer in the tank was about 20 to 30 minutes. Volatile components in the polymer were sufficiently removed, and then the polymer was discharged in the form of a rope, cooled underwater, and thereafter pelletized by a cutter, followed by recovery.

A living polymer solution was extracted into a sealed container within which a nitrogen atmosphere was maintained, from a pipe midway along the piping between the portion at which a polymerization solution is discharged from the polymerization reactor and the portion at which the terminator is added thereto, and then the abstract was used so as to determine the rate of conversion of each of the monomers. The rate of conversion of styrene was 99.9% or more, while the rate of conversion of (α-methylstyrene was 63%. From this result, the concentration of unreacted styrene when polymerization was terminated was 0.07% by weight or less of the polymer. In Table 1, various production conditions (such as the composition of the raw material solution, the flow rate of the raw material, the flow rate of the initiator, and the rate of conversion) are shown. Furthermore, in Table 2, the results of the composition of the resultant copolymer in pellet, the molecular weight and the like are shown.

Examples 2 to 8, and 10 to 12

Except for the conditions for: the composition of the raw material solution comprising styrene, α-methylstyrene and cyclohexane (CH), the flow rate of the raw material solution into the polymerization reactor, and the flow rate of the initiator solution into the polymerization reactor, as shown in Table 1, conditions and manners similar to the ones in Example 1 were employed for polymerization. In Table 1, various production conditions including the rate of conversion of each of monomers as abstracted from the polymerization reactor are shown. Furthermore, in Table 2, the results of the composition of the resultant copolymer in pellet, the molecular weight and the like are shown.

Example 9

A pelletized polymer was produced under conditions similar to the ones in Example 8, except that a polymerization temperature was set to 105° C. The molecular weight of the resultant polymer were Mw=117,000 and Mn=59,000, and the Tg was 127° C. In Table 1, various production conditions are shown. In Table 2, the composition of the resultant styrenic polymer, the molecular weight thereof and the like are shown.

Figure 2:
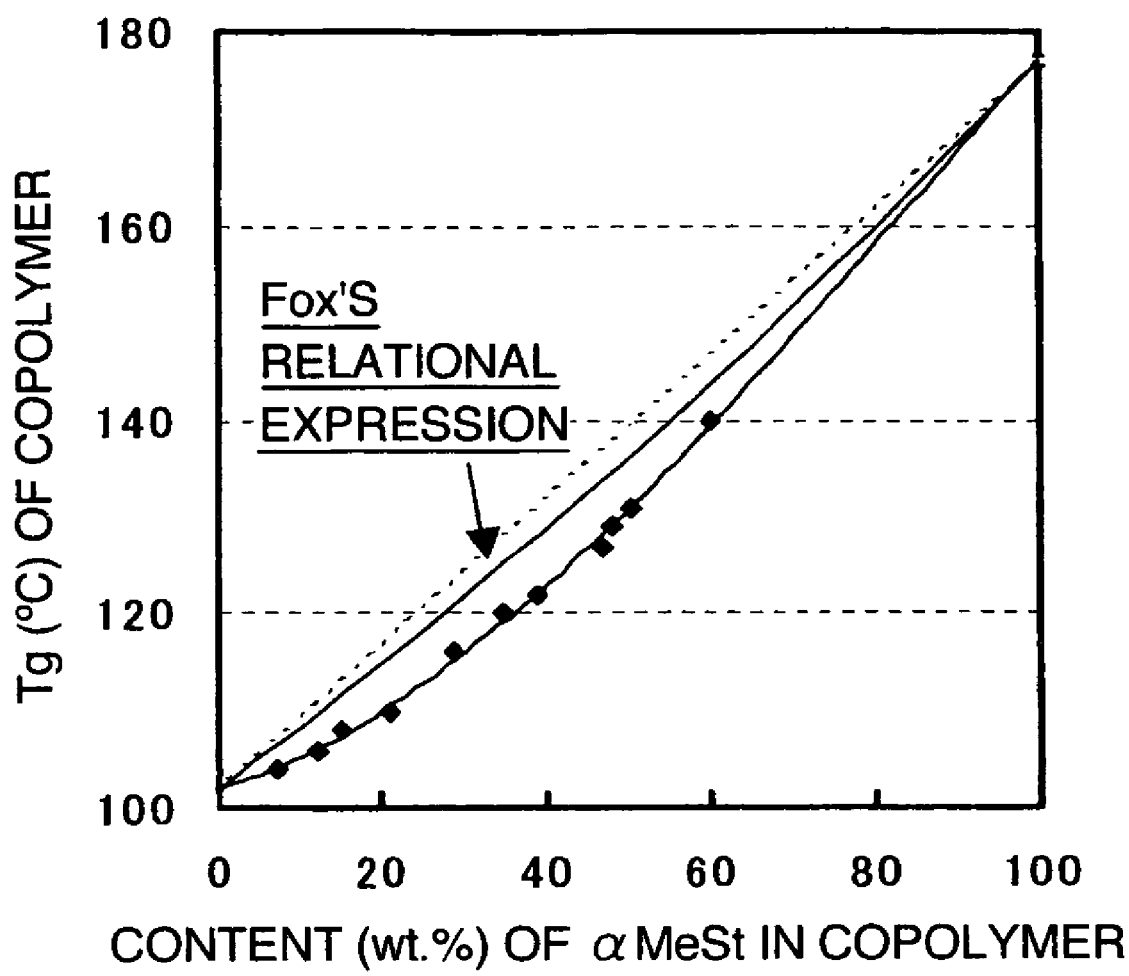
FIG. 2 is a diagram illustrating the relationship between [the content of α-methylstyrene included in a styrenic copolymer of the present invention] and [the glass-transition temperature (Tg)] (i.e., the relationship between [the content of α-methylstyrene in the copolymer of styrene and α-methylstyrene] and [Tg]). (Note: The Tg of polystyrene was 102 degree Celsius, while the Tg of poly α-methylstyrene was 177 degree Celsius. The dotted line is a straight line linking the two points.)

The relationship between [the content (% by weight) of α-methylstyrene in the copolymer pellets as obtained in each of Examples 1 to 12] and [the glass-transition temperature of the copolymer] is shown in FIG. 2.

In a copolymer of styrene and α-methylstyrene, as produced according to a conventional production method, the relationship between the content of (α-methylstyrene and Tg showed Fox's relationship, or a direct-proportional relationship (for example, see Non-Patent Document No. 1). However, it has been found that a styrenic copolymer as produced according to a production method of the present invention shows all its own correlation therebetween without showing any relationship as described above (see FIG. 2). In FIG. 2, the top line (i.e., the dotted line) is a straight line with which the two points, the Tg (102° C.) of polystyrene (wherein the content of α-methylstyrene is 0% by weight) and the Tg (177° C.) of α-methylstyrene (wherein the content of α-methylstyrene is 100% by weight) are connected. Additionally, the middle line in FIG. 2 is a curve as determined according to Fox's formula, while the undermost line is a curve as determined according to an approximate calculation using plots from Examples.

Example 13

A solution having a composition ratio of St (% by weight)/CH (% by weight)=23/77 was fed at a flow rate of 0.25 liter/hour into a sealed-type of polymerization reactor (R2) with agitating blades provided. Furthermore, from another supply port, an initiator solution (which is a solution of n-butyllithium as diluted with cyclohexane to 1/76) was fed thereinto at a flow rate of 0.19 liter/hour. The polymerization temperature was set to 50° C., and the revolving speed of the agitating blades was set to 175 rpm. A living polymer solution was abstracted at a flow rate of 0.33 liter/hour from the reactor (R1), followed by introduction via a piping into the same polymerization reactor (R1) as the reactor which was used in Example 1. Furthermore, a living polymer solution was abstracted midway along a piping as conducted from R2 to R1 so as to measure the molecular weight. As a result, Mw=49,700 and Mn=28,400. The rate of conversion of styrene was 99% or more.

A solution having a composition rate of St(% by weight)/(αMeSt(% by weight)/CH(% by weight)=26/26/48 was introduced via another piping into R1 at a flow rate of 1.14 liters/hour. The revolving speed of the agitating blades of R1 was set to 175 rpm, while the polymerization temperature was set to 85° C. The position of liquid level was controlled such that the average retention time of the polymeric solution is 1.9 hours. A polymeric solution as discharged from R1 was subjected to the termination of polymerization and the removal of the solvent according to a manner and conditions similar to the ones in Example 1, followed by recovery in the form of pellet. The molecular weight of the pellet was Mw=193,000 and Mn=89,200, while Tg=120° C. Furthermore, the content of αMeSt in the polymer was 36% by weight.

Example 14

A raw material solution having a composition ratio of St(% by weight)/αMeSt(% by weight)/CH(% by weight)=16/24/60 was fed at a flow rate of 2.1 litters/hour into the polymerization reactor (R1) as used in Example 1, while an initiator solution was fed into R1 via another piping at a flow rate of 0.18 litter/hour. The polymerization temperature was set to 82 to 85° C., the revolving speed of the agitating blades was set to 175 rpm, and the average retention time of a polymeric solution in R1 was set to 1.3 hours. The molecular weight of a polymer as obtained at a time point when the polymeric solution in R1 was in a steady state under the conditions as described above was Mw=143,000 and Mn=70,000, while Tg=126° C.

The composition ratio of a raw material solution was changed from St(% by weight)/αMeSt(% by weight)/CH(% by weight)=16/24/60 to St(% by weight)/CH(% by weight)=30/70, and the solution was introduced into the polymerization reactor (R1) at a flow rate of 2.1 liters/hour in a similar manner to the one as described above, while the flow rate of an initiator solution was also changed to 0.15 liter/hour. Sampling of a polymer was started from the time point when the composition of the raw material solution to be introduced into R1 had been changed, and sampling was carried out until the polymerization in R1 of the raw material solution having the composition ratio of St(% by weight)/CH(% by weight)=30/70 had been attained to a steady state. The term 'sampling' herein means that samples of all polymers as produced between from the time point when the second raw material solution having the composition ratio of St(% by weight)/CH(% by weight)=30/70 were introduced into the polymeric solution in the reactor wherein a polymerization using the first raw material solution having the composition ratio of St(% by weight)/αMeSt(% by weight)/CH(% by weight)=16/24/60 had been in a steady state, to the time point when a polymerization using the second raw material solution having the composition ratio of St(% by weight)/CH(% by weight)=30/70 had attained to a steady state, were collected. The wording 'a steady state' herein means a state wherein the composition of a raw material solution and the concentration of each of the components of a polymeric solution within R1 are not changed during definite period of time. A copolymer as obtained in this manner were the one wherein the content of a component from each monomer in the copolymer was continuously changed with time. In actual sampling, pellets were collected during about five hours after one hour from the time point when the composition of the first raw material solution had been changed. This is because one hour as a time difference was taken into consideration on the basis of the fact that a period of time from the time point when the composition of the first raw material solution had been changed to the time point when the raw material solution was formed into a polymer pellet after passing through the piping via the flashing tank was approximately one hour.

Polymer pellets which were sampled during the period of time from the time point when the second raw material solution had been introduced into the system of the polymeric solution wherein the polymerization using the first raw material solution had been in a steady state to the time point when the polymerization using the second raw material solution had attained to a steady state, were put into a blender and sufficiently mixed (that is, a copolymer composition comprising two or more copolymers which are different from each other in the content of a component from each monomer was prepared), whereby an apparently homogeneous mixture was obtained. The mixed pellets were used so as to produce an injection-molded product. The Tg of the injection-molded product was 115° C., while the molecular weight thereof was Mw=170,000 and Mn=80,000.

Example 15

Mixed pellets were obtained in a similar manner to the one in Example 14, except that the composition ratio of a raw material solution was changed from St(% by weight)/αMeSt(% by weight)/CH(% by weight)=16/24/60 as employed in Example 14 to St(% by weight)/αMeSt(% by weight)/CH(% by weight)=25/11/64, while an injection-molded product was produced in a similar manner to the one in Example 14. The Tg of the injection-molded product was 121° C., while the molecular weight of the product was Mw=179,000 and Mn=85,000.

In Table 3, the evaluation results of the mechanical properties of the injection-molded product of the styrenic copolymers as obtained in each of Examples 1 to 15 were shown.

Comparative Example 1

Polystyrene was produced in a similar manner to the one in Example 1, except that the composition ratio of a raw material solution was set to St(% by weight)/CH(% by weight)=35/65, the flow rate of the raw material solution was set to 2.2 liters/hour, and the flow rate of an initiator solution in which n-butyllithium is diluted with cyclohexane to 1/76 was set to 0.17 liter/hour. Unreacted styrene could not be observed in the measurement of GC, while the rate of conversion was 100%. The molecular weight of the resultant polystyrene was Mw=307,000 and Mn=157,000.

Comparative Example 2

A pelletized polymer was produced under similar conditions to the ones in Example 1, except that the composition ratio of a raw material solution was set to St(% by weight)/aMeSt(% by weight)/CH(% by weight)=16/24/60, the flow rate of the raw material solution was set to 2.1 liters/hour, and the flow rate of an initiator solution was set to 0.23 liter/hour. The molecular weight of the resultant polymer was Mw=35,000 and Mn=70,000, while the Tg was 126° C.

Comparative Example 3

A polystyrene (GPPS, #685, PS Japan Corporation) as obtained according to a free-radical polymerization was used. The Tg was 101° C.

Comparative Example 4

A styrene-methacrylic acid copolymer (SMAA, G9001, PS Japan Corporation) as obtained according to a free-radical polymerization was used. The Tg was 117° C.

A styrenic resin in each of Comparative Examples 1 to 4 was injection-molded, followed by evaluation in mechanical properties. In Table 3, the results are shown.

Examples of production of a copolymer of styrene and α-methylstyrene according to a living polymerization have been previously known (for example, see Non-Patent Document No. 1). One of problems with a copolymer as derived according to this production method is that the melt retention of the copolymer generates styrene and/or α-methylstyrene, and the generation rate is higher than that of a polystyrene as produced according to a free-radical polymerization method, which is industrially and widely utilized.

With respect to a copolymerization of styrene and α-methylstyrene, it is known that the more the content of α-methylstyrene is, the higher the heat resistance is, and concurrently the lower the kick-off temperature of a polymer during melt retention (see, for example, Non-Patent Document No. 1). As a result, there occurred the problem that the range of each of a suitable temperature and a period of time during melt processing is narrowed down along with the enhancement of the heat resistance of the resin, whereby molding becomes difficult and the application is limited.

The present inventor's more particular examination on this point has shown that a styrenic copolymer of the present invention can solve the problem as described above.

A polymer as obtained in each of Examples 1, 4 and 7 to 10, and Comparative Examples 1 and 3 was examined for heat stability in melt. The generation amount of styrene at a temperature of 280° C. for a retention time of each of 10 minutes, 20 minutes and 40 minutes was determined, and from the resultant slope the formation rate constant (k: ppm by weight/sec) of styrene was determined. In Table 4, the result is shown together with the results of the content of α-methylstyrene in the polymer and the absorbance of the polymer.

The generation rate of each of the styrenic copolymers of the present invention was sufficiently lower than that of a polystyrene as produced according to a free-radical polymerization method, which is industrially utilized. Among other results, a copolymer as polymerized in a cyclohexane solvent had about a half styrene-formation rate as compared with that of polystyrene as produced according to a free-radical polymerization method. From this result, it was found that the present invention could provide a copolymer which is remarkably excellent in heat stability at a molten state as compared with that of a conventional copolymer of styrene and α-methylstyrene, or that of a conventional polystyrene as produced according to a free-radical polymerization method.

Figure 4:
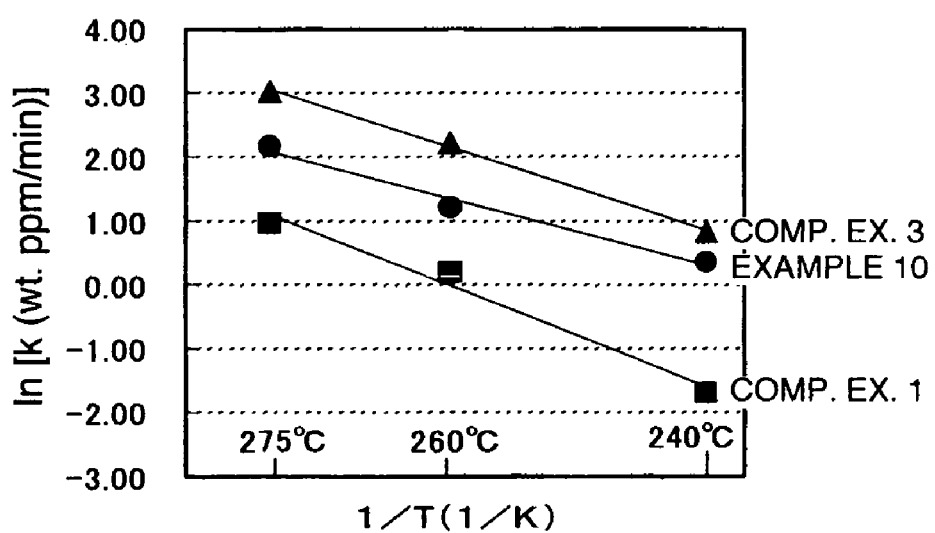
FIG. 4 is a diagram illustrating the relationship between [the temperature of a styrenic copolymer of the present invention during the melt retention of the styrenic copolymer] and [the rate constant of styrene generation during the period] (i.e., temperature dependency of the rate of styrene generation during the melting).

FIG. 4 shows the relationship (i.e., Arrhenius plot) between the formation rate (k: ppm/min) of styrene during melt retention at a temperature of 275° C., 260° C. or 240° C., and the temperature. As this result, it could be confirmed that a styrenic copolymer of the present invention is excellent in heat stability at a molten state at any temperature as compared with a polystyrene as produced according to a free-radical polymerization method, which is industrially utilized.

Figure 5:
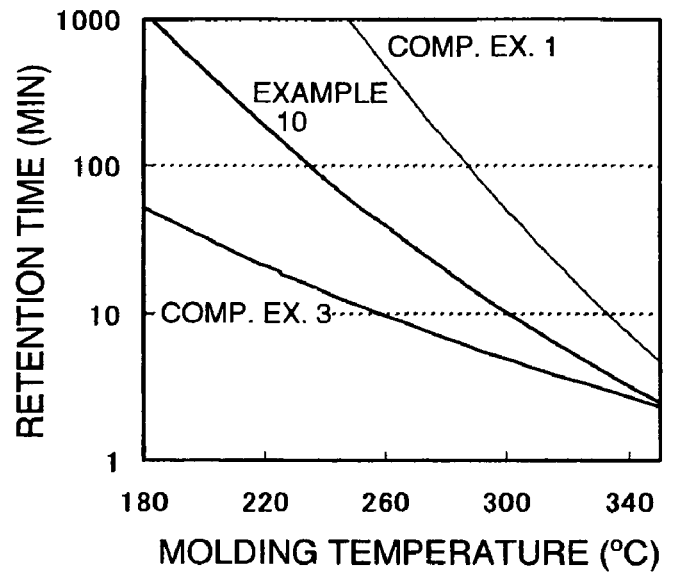
FIG. 5 is a diagram illustrating a temperature region wherein a silver blister is caused during the melt retention of a styrenic copolymer of the present invention within an injection machine (i.e., the temperature region wherein the silver blister is caused during the molding).

FIG. 5 shows a temperature range wherein a silver blister is caused during molding, which corresponds to the evaluation of heat stability at a molten state. Each of curves (showing temperature ranges) shown in FIG. 5 was introduced by the steps of: determining a retention time when a silver blister had been caused at each temperature, and calculating a correlation formula between the temperature and the retention time using the above results. The side above the curve (i.e., an area where the retention time is long) is an area wherein the occurrence of a silver blister is observed, while the side below the curve is an area wherein the occurrence of any silver blister is not observed.

From this result, it has been clarified that the range of a molding condition for a copolymer of styrene and α-methylstyrene of the present invention is broader than that of a polystyrene as produced according a free-radical polymerization.

Figure 3:
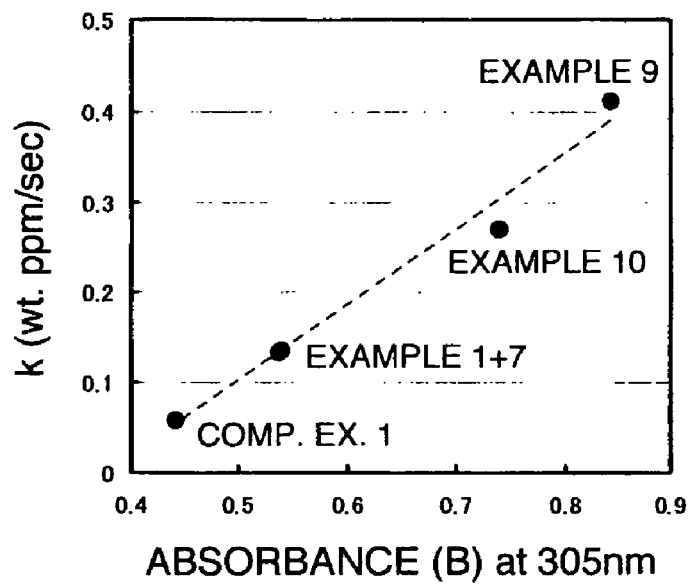
FIG. 3 is a diagram illustrating the relationship between [the rate constant of styrene generation during the melt retention of a styrenic copolymer of the present invention] and [the absorbance of the resultant molded product] (i.e., the relationship between [the absorbance of the copolymer] and [the rate of the monomer formation]). The straight line depicted in FIG. 3 is represented by the formula: k (ppm by weight/sec)= 0.8348B–0.316 ($R^2$ (coefficient of correlation)=0.9808).

Furthermore, the present inventor was devoted to making more efforts. As a result, it has been pinned down that a factor having a great influence on the decomposition rate of a polymer during melt retention, i.e., the generation rate of a monomer, lies in the polymer structure. Although a specific structural factor is not clarified yet, the characteristics of the polymer structure, as correlated to the polymer structure, have been found. That is, the absorbance of the polymer at a wavelength of 305 nm is greatly involved with the decomposition rate of the polymer. Therefore, in a use requiring, in particular, that a volatile component such as a monomer should be included as little as possible, a polymer wherein its absorbance at a wavelength of 305 nm is controlled in a range as clarified in the present invention should be used. FIG. 3 illustrates the relationship between the absorbance of a copolymer and 'k', wherein 'k' (ppm by weight/sec) was used to enter the vertical axis, while the absorbance of the styrene copolymer at a wavelength of 305 nm was used to enter the horizontal axis. That is, FIG. 3 graphs Table 4. In FIG. 3, the dotted line is the one approximating the relation between the numerical values of the vertical axis (i.e., the k-axis) and the numerical values of the horizontal axis (i.e., the B-axis) according to the least square method.

As another conventional problem, there exists the problem that the molded product of a copolymer of styrene and α-methylstyrene is yellowed.

The present inventor was devoted to making more efforts. As a result, it has been newly pinned down that the conventional thinking that the yellowing of the molded product is due to the content of Li therein is mistaken, and properly speaking, it is due to the polymer structure. Although a specific structural factor is not clarified yet, judging from the results so far obtained, it has been found that in order to suppress the yellowing, the following would be critical: 1) the point that the copolymer should be produced under a condition wherein a living growing species can be stabilized; and 2) the point that the copolymer should have a structure difficult to be pyrolyzed.

Specifically, it is preferred to use an nonpolar solvent as a solvent under manufacturing conditions for the copolymer. For example, a hydrocarbon solvent such as pentane, hexane (for example, cyclohexane or n-hexane), heptane or octane is preferred as compared with an aromatic hydrocarbon compound such as benzene, toluene, ethylbenzene or xylene.

Furthermore, although a polymerization for the copolymer can be carried out even in a polar solvent such as tetrahydrofuran, it is preferred not to use it for a use wherein the yellowing is critical. Beside, although a polar material such as N,N,N,N-tetramethylethlenediamine may be added in a small amount in order to decrease the association of living growing species, it is preferred to avoid such a polar material to the utmost because it promotes yellowing. It is preferred that a polymerization temperature is as low as possible. However, it is not preferred to lower the polymerization temperature in view of the productivity of the copolymer.

For example, when the copolymer is utilized as a use wherein the yellowing is not particularly critical, for example, such as a molded product to be colorized, or as a resin raw-material for a product which is not publicly exposed and is used within a structural material, the polymer may be produced without limiting it to the requirements as described above.

In Table 5, with respect to each of Examples 1, and 6 to 10, and Comparative Examples 1 and 3, a polymerization temperature, and the value of yellowness index of a molded product of a polymer as obtained by polymerization in cyclohexane or ethylbenzene as a solvent are shown together with a polymerization solvent used, and the content of (α-methylstyrene in the polymer.

It is important to decrease the yellowing of a molded product immediately after a resin has been molded, and furthermore, it is also an important performance requirement for some uses to decrease a yellowing rate when the molded product is exposed to light. In particular, in uses for optical parts, an optical part as put in an atmosphere near a light source requires heat resistance and light resistance.

The weatherability (or light resistance) of a copolymer of styrene and α-methylstyrene of the present invention was examined.

In FIG. 8, the result of the examined weatherability of a copolymer in each of Example 7 and Comparative Example 3 is shown, wherein YI was used to enter the vertical axis, and the time was used to enter the horizontal axis. It has been confirmed that a styrenic copolymer of the present invention is slower in yellowing rate than a conventional polystyrene.

In FIG. 9, the relationship between the heat resistance (Vicat temperature (° C.)) and the yellowing rate of a styrenic copolymer of styrene and α-methylstyrene in each of Examples 1, 7 and 10, and Comparative Example 1, and a polystyrene in Comparative Example 3 is shown. The wording 'a yellowing rate' herein means the value 'k' of a degree of change [ΔYI=YI (time of exposure)—YI (0)] from the initial yellowness index of a molded product as divided by a logarithmic time [ln(time of exposure in hour)] when the molded product was exposed to light by means of an acceleration testing machine.

From this result, it has been found that a styrenic copolymer of the present invention is a material excellent in heat resistance and light resistance, and in particular, it can be said to be an extremely suitable material as a use for an optical part.

Example 17

Figure 6:
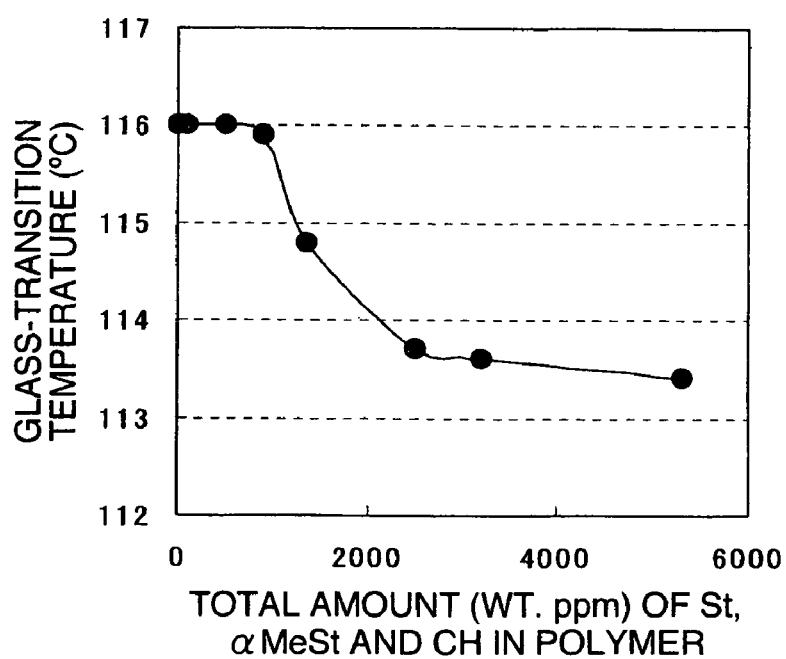
FIG. 6 is a diagram illustrating the relationship between [the total amount of styrene, α-methylstyrene and cyclohexane remaining in a styrenic copolymer of the present invention] and [the glass-transition temperature (Tg) of the resultant pellet] (i.e., the relationship between [the total amount of the monomers and the solvent in the polymer] and [Tg]).

According to the production method in Example 1, the degree of reduced pressure in a flashing container and the retention time were controlled so as to obtain pellets wherein the total amount (ppm by weight) of styrene (St), α-methylstyrene (αMeSt) and cyclohexane (CH) remaining in a pellet is different from each other. The total amount of styrene, α-methylstyrene and cyclohexane was determined by means of GC-MS. The Tg (° C.) of a pellet in Example 1 was determined by means of DSC. In FIG. 6, the relationship between the total amount of styrene, α-methylstyrene and cyclohexane and the Tg is shown.

From this result, it has been found that a resin molded-product having a glass-transition temperature which a copolymer essentially possesses can be produced by maintaining the total amount of styrene, α-methylstyrene and cyclohexane in a resin pellet to 2,500 ppm by weight or less.

Because styrene, α-methylstyrene and cyclohexane are partially volatilized during pellet molding-processing, when they are left in an amount of more than 2,500 ppm by weight in a pellet, variation in heat resistance and variation in the fluidity of a molten resin during molding-processing are remarkable, whereby it is difficult to provide a user with a resin stable in quality. In particular, the volatile weight loss of a monomer and/or a solvent as left in a resin is changed depending upon the device size of a molding-processing machine, the structure thereof, and the temperature conditions thereof in particular. Therefore, for example, when the heat-resistant temperature of a resin will be set to the vicinity of the critical value of a value in performance as required by a user, or when an extremely precise part will be formed, in particular, the control of the total amount of the materials as described above to 1,000 ppm by weight or less will further enhance stability in quality.

Example 18

Pellets as obtained in Examples 1 and 10 were melt-blended at a ratio of 50(% by weight)/50(% by weight) by means of a biaxial extruder. The resultant pellets were injection-molded so as to derive dumbbell specimens and strip specimens. Completely transparent molded products in visual observation were obtained. Measured mechanical properties were 55 MPa in tensile strength, 1.9% in tensile elongation, 97 MPa in flexural strength, and 3,360 MPa in flexural modulus, and thus no remarkable decrease in physical properties was caused, while the Tg was 122° C.

Figure 7:
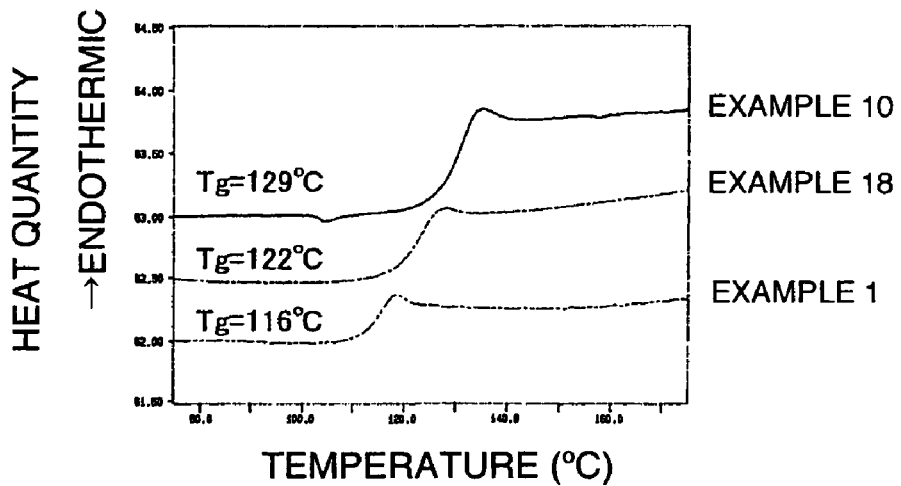
FIG. 7 is a DSC chart near the glass-transition temperature of each of styrenic copolymers of the present invention and a copolymer composition as obtained by melt-blending the styrenic copolymers, the styrenic copolymers having a different glass-transition temperature from that of the other (i.e., change of the heat quantity near Tg according to DSC).

FIG. 7 illustrates a DSC-chart of a pellet as produced in Example 18, as compared with that of a pellet as produced in each of Examples 1 and 10. In the DSC-chart of a pellet as produced in Example 18, a Tg-peak as derived from a pellet as produced in each of Examples 1 and 10 could not be observed, while a Tg-peak as derived from a pellet as produced in Example 18 was observed as an intermediate value between the Tg-peaks as derived from pellets as produced in Examples 1 and 10. From this result, it could be confirmed that each of the copolymer (in Example 1) having Tg=116° C. and the copolymer (in Example 10) having Tg=129° C. is a completely compatible system.

Example 19

The polystyrene pellets in Comparative Example 3 and the copolymer pellets in Example 13 were blended at a weight ratio of 70(% by weight)/30(% by weight) so as to obtain a resin composition by means of an extruder.

Example 20

The polystyrene pellets in Comparative Example 3 and the copolymer composition pellets in Example 14 were blended at a weight ratio of 70(% by weight)/30(% by weight) so as to obtain a resin composition by means of an extruder.

Example 21

The polystyrene pellets in Comparative Example 3 and the copolymer composition pellets in Example 15 were blended at a weight ratio of 70(% by weight)/30(% by weight) so as to obtain a resin composition by means of an extruder.

Example 22

The polystyrene pellets in Comparative Example 3 and the copolymer pellets in Example 1 were blended at a weight ratio of 70(% by weight)/30(% by weight) so as to obtain a resin composition by means of an extruder.

The resin composition as obtained in each of Examples 19 to 22 was injection-molded into dumbbell specimens and strip specimens, each of which was examined as to the degree of white turbidity according to visual observation. Furthermore, the tensile physical properties and the bending physical properties of the specimens were evaluated. In Table 6, the results of the physical properties thereof are shown together with the composition of components.

Comparative Example 5

The polystyrene in Comparative Example 3 was independently, without blending other resins, molted once by means of an extruder so as to obtain pellets.

Comparative Example 6

The polystyrene in Comparative Example 3 and SMAA in Comparative Example 4 were blended at a weight ratio of 70(% by weight)/30(% by weight) in a pellet-state so as to obtain a resin composition by means of an extruder.

Each of the resin in Comparative Example 5 and the resin composition in Comparative Example 6 was injection-molded into dumbbell specimens and strip specimens, each of which was examined as to the degree of white turbidity of the molded product according to visual observation. Furthermore, the tensile physical properties and the bending physical properties of the specimens were evaluated. In Table 6, the results of the physical properties thereof are shown together with the composition of components. From the results as shown in Table 6, it has been found that a styrenic copolymer of the present invention is excellent in compatibility with polystyrene, and thus a copolymer can be formed with no compatibilizing agent without causing a decrease in mechanical properties.

Among other things, from each of the copolymer (in Example 13) wherein a polystyrene component was blocked, and the copolymer composition (in each of Examples 14 and 15) having a composition distribution, a resin composition having mechanical properties which are approximately equivalent to those of polystyrene could be provided. Furthermore, the molded products as derived from the resin composition comprising the polystyrene and the styrenic copolymer of the present invention maintained transparency equivalent to that of the polystyrene without deteriorating its transparency. From the results as described above, according to the present invention, a styrenic copolymer which is excellent in both heat resistance and recycling properties, in particular, recycling properties for a general-purpose polystyrene, could be derived for the first time.

Examples 23 and 24, and Comparative Example 7

Resin pellets in each of Examples 1 and 10 and Comparative Example 3 were used so as to produce an extruded sheet. Furthermore, the sheet was heated by means of a tenter, followed by monoaxial stretching. The percent of stretch was set to five times. Besides, resin pellets in each of Example 1 and Comparative Example 3 were subjected to compression molding so as to form plates each of which has a two-millimeter thickness and seven-centimeter sides. Thereafter, the plates were heated by means of a tenter in a similar manner to the one as described above, followed by biaxial stretching. The percent of stretch was set to three times.

A bit of each of the resultant sheets was cut off, and the cut sheet was mixed with a little of water in a polypropylene cup, which was then sealed with a polyvinylidene chloride cap. The cup was put in an electronic oven, followed by heating at 1,500 W for a one minute. The degree of deformation (as an index for heat resistance) of the sheet after heating was visually observed. In Table 7, the results of the degrees of deformation were shown together with the Tg and the used resins (as Examples 23 and 24 and Comparative Example 7).

Additionally, resin pellets in each of Examples 1 and 10, and Comparative Example 3 were used so as to produce extruded foamed sheet.

A bit of each of the resultant sheets was cut off, the heat resistance of the cut sheet was examined in a similar manner to the one described above. In Table 7, the results are shown.

From these results, it has been found that according to the present invention a stretched sheet and a foamed sheet which resists heat by means of an electronic oven can be obtained.

Examples 25 and 26, and Comparative Example 8

From the foamed sheet as obtained in each of Examples 23 and 24 and Comparative Example 7, test pieces were cut off such that the surface area of each of the test pieces was 80 cm$^2$, and left as it is in a thermostatic chamber having a temperature of 23° C. and a relative humidity of 50% for 35 days, and thereafter put in a 10-liter tetra-bag which is replaced with nitrogen. Thereafter, each of the test pieces was heated at a temperature of 65° C. for a period of two hours, and all gases in the tetra-bag were collected, and the amount of styrene in the gases (i.e., the volatile amount of styrene (μg)) was determined by means of GC-MS. In Table 8, the results are shown together with the Tg and the used resins.

From these results, it has been found that since a styrenic copolymer of the present invention is excellent in heat stability during melting, the amount of residual monomers in a molded product is remarkably small, and thus the amount of components as volatilized from the molded product is smaller as compared with that from a conventional styrenic resin material. Accordingly, a styrenic copolymer of the present invention is remarkably suitable for a material to be utilized in the interior of a house or a car.

TABLE 1

| Example No. | Composition of Raw Material Solution (wt. %) | | | Flow Rate of Raw-Material Solution (L/hr) | Flow Rate of Initiator Solution (L/hr) | Rate of Conversion (%) | |
|---|---|---|---|---|---|---|---|
| | St | αMeSt | CH | | | St | αMeSt |
| 1 | 27 | 18 | 55 | 2.1 | 0.25 | >99.9 | 63 |
| 2 | 30 | 6 | 64 | 2.1 | 0.20 | | |
| 3 | 30 | 5 | 65 | 1.2 | 0.10[1] | >99.9 | 74 |
| 4 | 34 | 10 | 56 | 2.1 | 0.21 | | |
| 5 | 25 | 10 | 65 | 1.2 | 0.15[1] | >99.9 | 74 |
| 6 | 25 | 10 | 65 | 1.2 | 0.10[1] | >99.9 | 81 |
| 7 | 23 | 22 | 55 | 2.1 | 0.19 | | |
| 8 | 23 | 22 | (55)[2] | 2.1 | 0.20 | | |
| 9 | 18 | 27 | (55)[2] | 2.1 | 0.45 | | |
| 10 | 18 | 27 | 55 | 2.1 | 0.45 | | |
| 11 | 16 | 29 | 55 | 2.1 | 0.44 | | |
| 12 | 11 | 34 | 55 | 2.1 | 0.45 | | |

[1] n-butyllithium (of 15% by weight in a n-hexane solution; (Wako Pure Industries, Ltd.) was diluted with cyclohexane to 1/76.
[2] Ethylbenzene was used as a solvent.
Each of blank positions in the table represents "undetermined".

TABLE 2

| Example No. | Composition of Copolymer (wt. %) | | Molecular Weight | | | Upper and Lower Limits of $Mw \times 10^{-3}$ of Formula (c) | | Tg (°C.) | Upper and Lower Limits of Formula (a) | |
|---|---|---|---|---|---|---|---|---|---|---|
| | St | αMeSt | $Mn \times 10^{-3}$ | $Mw \times 10^{-3}$ | Mw/Mn | Lower Limit | Upper Limit | | Lower Limit | Upper Limit |
| 2 | 93 | 7 | 75 | 157 | 2.09 | 99.3 | 481 | 104 | 102.8 | 106.3 |
| 3 | 88 | 12 | 128 | 264 | 2.06 | 99.0 | 419 | 106 | 103.4 | 109.4 |
| 4 | 85 | 15 | 103 | 209 | 2.03 | 98.3 | 385 | 108 | 103.8 | 111.3 |
| 5 | 79 | 21 | 82 | 178 | 2.17 | 95.9 | 326 | 110 | 104.9 | 114.9 |
| 6 | 79 | 21 | 127 | 269 | 2.12 | 95.9 | 326 | 110 | 104.9 | 114.9 |
| 1 | 71 | 29 | 75 | 150 | 2.00 | 90.6 | 262 | 116 | 109.9 | 119.9 |
| 7 | 62 | 35 | 90 | 190 | 2.11 | 85.0 | 222 | 120 | 114.1 | 124.1 |
| 8 | 61 | 39 | 73 | 148 | 2.03 | 80.5 | 204 | 122 | 117.2 | 127.2 |
| 9 | 53 | 47 | 59 | 117 | 1.98 | 69.7 | 159 | 127 | 123.7 | 133.7 |
| 10 | 52 | 48 | 66 | 131 | 1.98 | 68.1 | 155 | 129 | 124.6 | 134.6 |
| 11 | 50 | 50 | 64 | 132 | 2.06 | 65.0 | 146 | 131 | 126.3 | 136.3 |
| 12 | 40 | 60 | 53 | 110 | 2.08 | 47.0 | 111 | 140 | 135.2 | 145.2 |

TABLE 3

| Example No. | Mechanical Properties | | | | |
|---|---|---|---|---|---|
| | Heat Resistance Tg (°C.) | Tensile Strength (MPa) | Tensile Elongation (%) | Flexural Strength (MPa) | Elastic Modulus in Bending (MPa) |
| 2 | 104 | 53 | 1.8 | 95 | 3330 |
| 3 | 106 | 54 | 2.5 | 96 | 3360 |
| 4 | 108 | 54 | 2.0 | 96 | 3330 |
| 5 | 110 | 53 | 1.9 | 91 | 3370 |
| 6 | 110 | 54 | 2.3 | 97 | 3380 |
| 1 | 117 | 54 | 1.8 | 97 | 3500 |
| 7 | 120 | 63 | 2.7 | 108 | 3370 |
| 8 | 122 | 55 | 2.0 | 98 | 3370 |
| 9 | 127 | 52 | 1.6 | 93 | 3450 |
| 10 | 129 | 57 | 1.8 | 104 | 3560 |
| 11 | 131 | 58 | 1.8 | 106 | 3570 |
| 12 | 140 | 60 | 1.6 | 1090 | 3650 |
| 13 | 120 | 61 | 2.5 | 100 | 3450 |
| 14 | 115 | 53 | 2.2 | 91 | 3370 |
| 15 | 121 | 62 | 2.7 | 108 | 3370 |
| Comp. Ex. | | | | | |
| 1 | 101 | 53 | 3.3 | 100 | 3300 |
| 2 | 125 | 27 | 0.8 | 23 | 3200 |
| 3 | 102 | 53 | 3.2 | 95 | 3300 |
| 4 | 117 | 52 | 1.8 | 96 | 3360 |

TABLE 4

| No. | Amount of αMeSt (wt. %) | k (wt. ppm/sec) | Absorbance (B) | Remarks |
|---|---|---|---|---|
| Comp. Ex. 1 | 0 | 0.058 | 0.441 | Living Polymerization |
| Example 4 | 15 | 0.073 | | Living Polymerization |
| Example 1 | 29 | 0.133 | 0.537 | Living Polymerization |
| Example 7 | 35 | 0.137 | 0.540 | Living Polymerization |
| Example 8 | 39 | 0.182 | | Living Polymerization |
| Example 9 | 47 | 0.410 | 0.843 | Living Polymerization |
| Example 10 | 48 | 0.270 | 0.739 | Living Polymerization |
| Comp. Ex. 3 | 0 | 0.510 | | Free-Radical Polymerization |

Each of blank positions in the table represents "undetermined".

TABLE 5

| Sample No. | Solvent for Polymerization | Temperature for Polymerization (° C.) | αMeSt (wt. %) | YI | Remarks |
|---|---|---|---|---|---|
| Comparative Ex. 1 | CH | 84 | 0 | 1.6 | Living Polymerization |
| Comparative Ex. 3 | — | — | 0 | 1.6 | Free-Radical Polymerization |
| Example 6 | CH | 84 | 21 | 1.6 | Living Polymerization |
| Example 1 | CH | 84 | 29 | 1.7 | Living Polymerization |
| Example 7 | CH | 84 | 35 | 1.9 | Living Polymerization |
| Example 10 | CH | 84 | 48 | 2.0 | Living Polymerization |
| Example 8 | EB | 84 | 39 | 3.5 | Living Polymerization |
| Example 9 | EB | 105 | 47 | 6.1 | Living Polymerization |

TABLE 6

| Example or Comp. Ex. No. | Composition (wt. %) PS | Composition (wt. %) Copolymer | Transparency Visual Determination*) | Mechanical Physical Properties Tensile Strength (MPa) | Mechanical Physical Properties Tensile Elongation (%) | Mechanical Physical Properties Flexural Strength (MPa) | Mechanical Physical Properties Elastic Modulus in Bending (MPa) |
|---|---|---|---|---|---|---|---|
| Example 19 | 70 | 30 | ○ | 53 | 1.8 | 95 | 3330 |
| Example 20 | 70 | 30 | ○ | 54 | 2.5 | 96 | 3360 |
| Example 21 | 70 | 30 | ○ | 54 | 2.0 | 96 | 3330 |
| Example 22 | 70 | 30 | ○ | 53 | 1.9 | 91 | 3370 |
| Comp. Ex. 5 | 100 | 0 | ○ | 54 | 2.3 | 97 | 3380 |
| Comp. Ex. 6 | 70 | 30 | X | 54 | 1.8 | 97 | 3500 |

*)○: without white turbidity, and X: with white turbidity

TABLE 7

| Example & Comparative Ex. | Tg (° C.) | Used Resin | Monoaxially Stretched Sheet | Biaxially Stretched Sheet | Foamed Sheet |
|---|---|---|---|---|---|
| Example 23 | 116 | Example 1 | ○ | ○ | ○ |
| Example 24 | 129 | Example 10 | ○ | — | ○ |
| Comparative Ex. 7 | 101 | Comparative Ex. 7 | X | X | Δ |

Note:
○: with no deformation;
Δ: with warping deformation; and
X: with large deformation

TABLE 8

| | Example & Comparative Ex. | | |
|---|---|---|---|
| | Example 25 | Example 26 | Comparative Ex. 8 |
| Tg (° C.) | 116 | 129 | 101 |
| Used Resin | Example 1 | Example 10 | Comparative Ex. 3 |

TABLE 8-continued

| | Example & Comparative Ex. | | |
|---|---|---|---|
| | Example 25 | Example 26 | Comparative Ex. 8 |
| Volatile Amount (μg) | 0.8 | 1.0 | 14.2 |

INDUSTRIAL APPLICABILITY

A styrenic copolymer of the present invention is excellent in performance properties such as heat resistance, weatherability, melt stability during molding, and recycle properties, with the excellent properties of conventional polystyrene, such as transparency, dimensional stability, and molding-processing properties being maintained. Therefore, it is suitable for injection-molded products, extrusion-molded products, sheets and foams, and furthermore suitable for a structural material and a container which require transparency, heat resistance, and high rigidity, and a molded product which require heat resistance, and weatherability. In particular, it can be utilized as a food packaging container which may be warmed in electronic oven, a part for a house, a part for a car interior, or an optical part.

The invention claimed is:

1. A styrenic copolymer produced by a living polymerization method comprising
an isopropenyl aromatic unit represented by the formula (1):

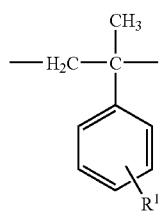

wherein the substituent group $R^1$ represents hydrogen, or a hydrocarbon radical of $-C_nH_{2n+1}$ wherein n is an integer number of 1 or more, and
a vinyl aromatic unit represented by the formula (2):

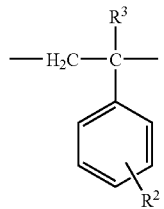

wherein the substituent group $R^2$ represents hydrogen, or a hydrocarbon radical of $-C_nH_{2n+1}$ wherein n is an integer number of 1 or more, and the substituent group $R^3$ represents hydrogen or a phenyl radical,
wherein the content (A) of said isopropenyl aromatic unit in said styrenic copolymer is in a range of 5 to 95% by weight, a ratio (Mw/Mn) of a weight-average molecular weight (Mw) of said styrenic copolymer to a number-average molecular weight (Mn) thereof is in the range of 1.6 to 4.0, and the weight-average molecular weight (Mw) of said styrenic copolymer is 70,000 or more, and
wherein the relationship between the content (% by weight) (A) of said isopropenyl aromatic unit in said styrenic copolymer and the glass-transition temperature (° C.) (Tg) of said styrenic copolymer satisfies the formulae (a):

$0.12A+102 \leq Tg \leq 0.62A+102$ (in case of $5 \leq A \leq 20$), $-5.25 \times 10^{-5}A^3 + 1.09 \times 10^{-2}A^2 + 1.72 \times 10^{-1}A + 97 \leq Tg \leq -5.25 \times 10^{-5}A^3 + 1.09 \times 10^{-2}A^2 + 1.72 \times 10^{-1}A + 107$ (in case of $20 < A < 60$), and $1.04A+73 \leq Tg \leq 0.79A+98$ (in case of $60 < A \leq 95$).

2. A styrenic copolymer according to claim 1, wherein the content (% by weight) (A) of said isopropenyl aromatic unit in said styrenic copolymer, and the absorbance (B) of said styrenic copolymer at a light having a wavelength of 305 nm satisfy the formula (b):

$B \leq 0.0002A^2 - 0.0017A + 0.52$.

3. A styrenic copolymer according to claim 1, wherein the relationship between the content (% by weight) (A) of said isopropenyl aromatic unit in said styrenic copolymer and the weight-average molecular weight (Mw) of said styrenic copolymer satisfies the formula (c):

$-1.92 \times 10^{-2}A^2 + 2.95 \times 10^{-1}A + 98.2 \leq Mw \times 10^{-3} \leq \exp(6.37 - 2.77 \times 10^{-2}A)$.

4. An injection-molded article comprising a styrenic copolymer of claim 1 as described above.

5. An extrusion-molded article comprising a styrenic copolymer of claim 1 as described above.

6. A sheet comprising a styrenic copolymer of claim 1 as described above.

7. A foam comprising a styrenic copolymer of claim 1 as described above.

8. A food container for warming, comprising a styrenic copolymer of claim 1 as described above.

9. A part for houses, comprising a styrenic copolymer of claim 1 as described above.

10. A part for a car interior, comprising a styrenic copolymer of claim 1 as described above.

11. An optical part comprising a styrenic copolymer of claim 1 as described above.

12. The styrenic copolymer according to claim 1, wherein the styrenic copolymer is produced from an isopropenyl aromatic monomer and a vinyl aromatic monomer with a feed ratio of the isopropenyl aromatic monomer to the vinyl aromatic monomer being sequentially changed over time as the styrenic copolymer is produced.

* * * * *

UNITED STATES PATENT AND TRADEMARK OFFICE
CERTIFICATE OF CORRECTION

| | | |
|---|---|---|
| PATENT NO. | : 7,781,552 B2 | Page 1 of 1 |
| APPLICATION NO. | : 10/577931 | |
| DATED | : August 24, 2010 | |
| INVENTOR(S) | : Kenji Ebara | |

It is certified that error appears in the above-identified patent and that said Letters Patent is hereby corrected as shown below:

Column 46, Line 8-9 delete "weight_(Mw)" and insert --weight (Mw)--.

Column 46, Line 19 delete "20<A<60)," and insert --20<A≤60),--.

Signed and Sealed this
Fourth Day of January, 2011

David J. Kappos
*Director of the United States Patent and Trademark Office*